United States Patent
Zhu

(10) Patent No.: US 9,641,421 B2
(45) Date of Patent: May 2, 2017

(54) MESSAGE TRANSMITTING METHOD, MESSAGE RECEIVING METHOD, OPENFLOW CONTROLLER AND FIRST OPENFLOW SWITCH

(71) Applicant: Huawei Technologies Co., LTD., Shenzhen (CN)

(72) Inventor: Mingming Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 194 days.

(21) Appl. No.: 14/292,121

(22) Filed: May 30, 2014

(65) Prior Publication Data
US 2014/0269708 A1  Sep. 18, 2014

Related U.S. Application Data

(63) Continuation of application No. PCT/CN2011/083391, filed on Dec. 2, 2011.

(51) Int. Cl.
*H04L 12/701* (2013.01)
*H04L 12/70* (2013.01)
(Continued)

(52) U.S. Cl.
CPC ............ *H04L 45/00* (2013.01); *H04L 12/185* (2013.01); *H04L 41/0806* (2013.01); *H04L 41/0886* (2013.01)

(58) Field of Classification Search
None
See application file for complete search history.

(56) References Cited

U.S. PATENT DOCUMENTS

2003/0086367 A1* 5/2003 Bengston ............ H04L 41/0654
370/216
2007/0113284 A1 5/2007 O'Rourke et al.
(Continued)

FOREIGN PATENT DOCUMENTS

CN  101390342 A  3/2009
CN  101877671 A  11/2010
(Continued)

OTHER PUBLICATIONS

OpenFlow Switch Specification, Version 1.1.0 Implemented (Wire Protocol 0x02) Feb. 28, 2011, 56 pages.
(Continued)

*Primary Examiner* — Kevin C Harper
*Assistant Examiner* — Derrick V Rose
(74) *Attorney, Agent, or Firm* — Brinks Gilson & Lione

(57) ABSTRACT

A message transmitting method is provided, comprising: receiving a first message sent from a first OpenFlow switch by an OpenFlow controller; transmitting a first response message to the first OpenFlow switch by the OpenFlow controller when the OpenFlow controller determines that the first OpenFlow switch is under the management of the OpenFlow controller, wherein the first response message comprises type information and parameters related to the OpenFlow controller, the first connection is a connection to be established between the first OpenFlow switch and the OpenFlow controller, and the first response message corresponds to the first message. Furthermore, other message transmitting methods, message receiving methods, OpenFlow controllers and first OpenFlow switches are provided in embodiments of the present invention. With the technical solutions provided in embodiments of the present invention, the OpenFlow switch or the OpenFlow controller can auto-
(Continued)

matically acquire parameters of a connection to be established.

36 Claims, 13 Drawing Sheets

(51) Int. Cl.
  *H04L 12/18* (2006.01)
  *H04L 12/24* (2006.01)

(56) References Cited

U.S. PATENT DOCUMENTS

| | | | |
|---|---|---|---|
| 2010/0082809 A1 | 4/2010 | Nakamura | |
| 2011/0261825 A1 | 10/2011 | Ichino | |
| 2011/0286359 A1* | 11/2011 | Shimonishi | H04L 45/38 370/254 |
| 2011/0289230 A1 | 11/2011 | Ueno | |
| 2012/0008629 A1 | 1/2012 | Chiba et al. | |
| 2013/0094350 A1* | 4/2013 | Mandal | H04L 45/64 370/217 |
| 2013/0145008 A1* | 6/2013 | Kannan | H04L 45/586 709/223 |
| 2013/0148667 A1* | 6/2013 | Hama | H04L 12/4633 370/400 |
| 2013/0246655 A1* | 9/2013 | Itoh | H04L 12/56 709/238 |

FOREIGN PATENT DOCUMENTS

| | | |
|---|---|---|
| CN | 102308534 A | 1/2012 |
| CN | 103975561 B | 2/2017 |
| WO | WO 2010/103909 A1 | 9/2010 |
| WO | WO 2011/030462 A1 | 3/2011 |
| WO | WO 2011/144495 A1 | 11/2011 |

OTHER PUBLICATIONS

Vujošvić, "Investigation and validation of the OpenFlow protocol for next generation converged optical networks" Master Thesis Report, Barcelona School of Telecommunication Engineering, Jul. 2011, 100 pages.

Huawei, "Discovery Protocol and Link Layer Discovery Protocol," Nov. 16, 2012, 1 page.

* cited by examiner

MESSAGE TRANSMITTING METHOD, MESSAGE RECEIVING METHOD, OPENFLOW CONTROLLER AND FIRST OPENFLOW SWITCH

CROSS-REFERENCE TO RELATED APPLICATIONS

This application is a continuation of International Application No. PCT/CN2011/083391, filed on Dec. 2, 2011, which is hereby incorporated by reference in its entirety.

FIELD OF TECHNOLOGY

The present invention relates to communication techniques, and more specifically, to a message transmitting method, a message receiving method, an OpenFlow controller and a first OpenFlow switch.

BACKGROUND

OpenFlow is a novel network model. An OpenFlow network may comprise an OpenFlow switch and an OpenFlow controller. Before communication between the OpenFlow switch and the OpenFlow controller, a connection has to be established therebetween. In order to realize the establishment of the connection, parameters of the connection to be established may be configured manually. Upon the parameter configuration of the connection to be established, the OpenFlow switch and the OpenFlow controller can perform connection establishment actions according to the parameters of the connection to be established.

The inventors have found the following problems in the prior art.

Configuring parameters of a connection to be established manually leads to a lower efficiency of establishing the connection between an OpenFlow switch and an OpenFlow controller, which is adverse for rapid connection establishment.

SUMMARY

Technical solutions provided in embodiments of the present invention enable the automatic acquisition of parameters of a connection to be established. An OpenFlow switch or an OpenFlow controller can establish the connection between the (an) OpenFlow controller and the (an) OpenFlow switch according to the parameters acquired automatically.

On one aspect, a message transmitting method is provided in an embodiment of the present invention, comprising:

receiving a first message sent from a first OpenFlow switch by an OpenFlow controller;

when the OpenFlow controller determines according to the first message that the first OpenFlow switch is under the management of the OpenFlow controller, transmitting a first response message to the first OpenFlow switch by the OpenFlow controller, wherein the first response message comprises type information of a first connection and parameters related to the OpenFlow controller among parameters of the first connection, the first connection is a connection to be established between the first OpenFlow switch and the OpenFlow controller, and the first response message corresponds to the first message.

On another aspect, a message receiving method is provided in an embodiment of the present invention, comprising:

transmitting a first message to an OpenFlow controller by a first OpenFlow switch, so that the OpenFlow controller sends a first response message to the first OpenFlow switch when the OpenFlow controller determines according to the first message that the first OpenFlow switch is under the management of the OpenFlow controller, wherein the first response message comprises type information of a first connection and parameters related to the OpenFlow controller among parameters of the first connection, the first connection is a connection to be established between the first OpenFlow switch and the OpenFlow controller, and the first response message corresponds to the first message;

receiving the first response message by the first OpenFlow switch.

On another aspect, a message transmitting method is provided in an embodiment of the present invention, comprising:

receiving a first message sent by a first OpenFlow switch by an OpenFlow controller;

when the OpenFlow controller determines according to the first message that the first OpenFlow switch is under the management of the OpenFlow controller, transmitting a first response message to the first OpenFlow switch by the OpenFlow controller, wherein the first response message corresponds to the first message;

receiving a second message sent from the first OpenFlow switch by the OpenFlow controller, wherein the second message comprises type information of a first connection and parameters related to the first OpenFlow switch among parameters of the first connection, and the first connection is a connection to be established between the first OpenFlow switch and the OpenFlow controller.

On another aspect, a message receiving method is provided in an embodiment of the present invention, comprising:

transmitting a first message to an OpenFlow controller by a first OpenFlow switch, so that when the OpenFlow controller determines according to the first message that the first OpenFlow switch is under the management of the OpenFlow controller, the OpenFlow controller sends a first response message to the first OpenFlow switch, wherein the first response message corresponds to the first message;

receiving the first response message by the first OpenFlow switch;

transmitting a second message to the OpenFlow controller by the first OpenFlow switch, wherein the second message comprises type information of a first connection and parameters related to the first OpenFlow switch among parameters of the first connection, and the first connection is a connection to be established between the first OpenFlow switch and the OpenFlow controller.

On another aspect, a message transmitting method is provided in an embodiment of the present invention, comprising:

receiving a first message sent by a first OpenFlow switch by an OpenFlow controller;

when the OpenFlow controller determines according to the first message that the first OpenFlow switch is under the management of the OpenFlow controller, transmitting a first response message to the first OpenFlow switch by the OpenFlow controller, wherein the first response message corresponds to the first message;

transmitting a second message to the first OpenFlow switch by the OpenFlow controller, wherein the second message comprises type information of a first connection and parameters related to the OpenFlow controller among parameters of the first connection, and the first connection is a connection to be established between the first OpenFlow switch and the OpenFlow controller.

On another aspect, a message receiving method is provided in an embodiment of the present invention, comprising:

transmitting a first message to an OpenFlow controller by a first OpenFlow switch, so that when the OpenFlow controller determines according to the first message that the first OpenFlow switch is under the management of the OpenFlow controller, the OpenFlow controller sends a first response message to the first OpenFlow switch, wherein the first response message corresponds to the first message;

receiving the first response message by the first OpenFlow switch;

receiving a second message sent from the OpenFlow controller by the first OpenFlow switch, wherein the second message comprises type information of a first connection and parameters related to the OpenFlow controller among parameters of the first connection, and the first connection is a connection to be established between the first OpenFlow switch and the OpenFlow controller.

On another aspect, a message transmitting method is provided in an embodiment of the present invention, comprising:

receiving a first message sent by a first OpenFlow switch by an OpenFlow controller;

when the OpenFlow controller determines according to the first message that the first OpenFlow switch is under the management of the OpenFlow controller, transmitting a first response message to the first OpenFlow switch by the OpenFlow controller, wherein the first response message corresponds to the first message;

transmitting a second message to the first OpenFlow switch by the OpenFlow controller, wherein the second message comprises type information of a first connection and parameters related to the OpenFlow controller among parameters of the first connection, and the first connection is a connection to be established between the first OpenFlow switch and the OpenFlow controller;

receiving a second response message sent from the first OpenFlow switch by the OpenFlow controller, wherein the second response message comprises parameters related to the first OpenFlow switch among the parameters of the first connection; and the second response message corresponds to the second message.

On another aspect, a message receiving method is provided in an embodiment of the present invention, comprising:

transmitting a first message to an OpenFlow controller by a first OpenFlow switch, so that when the OpenFlow controller determines according to the first message that the first OpenFlow switch is under the management of the OpenFlow controller, the OpenFlow controller sends a first response message to the first OpenFlow switch, wherein the first response message corresponds to the first message;

receiving the first response message by the first OpenFlow switch;

receiving a second message sent from the OpenFlow controller by the first OpenFlow switch, wherein the second message comprises type information of a first connection and parameters related to the OpenFlow controller among parameters of the first connection, and the first connection is a connection to be established between the first OpenFlow switch and the OpenFlow controller;

transmitting a second response message to the OpenFlow controller by the first OpenFlow switch, wherein the second response message comprises parameters related to the first OpenFlow switch among the parameters of the first connection, and the second response message corresponds to the second message.

On another aspect, a message transmitting method is provided in an embodiment of the present invention, comprising:

receiving a first message sent by a first OpenFlow switch by an OpenFlow controller;

when the OpenFlow controller determines according to the first message that the first OpenFlow switch is under the management of the OpenFlow controller, transmitting a first response message to the first OpenFlow switch by the OpenFlow controller, wherein the first response message corresponds to the first message;

receiving a second message sent from the first OpenFlow switch by the OpenFlow controller, wherein the second message comprises type information of a first connection and parameters related to the first OpenFlow switch among parameters of the first connection, and the first connection is a connection to be established between the first OpenFlow switch and the OpenFlow controller;

transmitting a second response message to the first OpenFlow switch by the OpenFlow controller, wherein the second response message comprises parameters related to the OpenFlow controller among the parameters of the first connection.

On another aspect, a message receiving method is provided in an embodiment of the present invention, comprising:

transmitting a first message to an OpenFlow controller by a first OpenFlow switch, so that when the OpenFlow controller determines according to the first message that the first OpenFlow switch is under the management of the OpenFlow controller, the OpenFlow controller sends a first response message to the first OpenFlow switch, wherein the first response message corresponds to the first message;

receiving the first response message by the first OpenFlow switch;

transmitting a second message to the OpenFlow controller by the first OpenFlow switch, wherein the second message comprises type information of a first connection and parameters related to the first OpenFlow switch among parameters of the first connection, and the first connection is a connection to be established between the first OpenFlow switch and the OpenFlow controller;

receiving a second response message sent from the OpenFlow controller by the first OpenFlow switch, wherein the second response message comprises parameters related to the OpenFlow controller among the parameters of the first connection.

On one aspect, an OpenFlow controller is provided in an embodiment of the present invention, comprising:

a receiver and a transmitter, wherein, the receiver is configured to receive a first message sent from a first OpenFlow switch;

the transmitter comprises a determination unit and a transmission unit, wherein, the determination unit is configured to determine according to the first message whether the first OpenFlow switch is under the management of the OpenFlow controller;

the transmission unit is configured to send a first response message to the first OpenFlow switch when the determination unit determines that the first OpenFlow switch is under the management of the OpenFlow controller, wherein the first response message comprises type information of a first connection and parameters related to the OpenFlow controller among parameters of the first connection, the first connection is a connection to be established between the first OpenFlow switch and the OpenFlow controller, and the first response message corresponds to the first message.

On another aspect, a first OpenFlow switch is provided in an embodiment of the present invention, comprising:

a transmitter configured to transmit a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message comprises type information of a first connection and parameters related to the OpenFlow controller among parameters of the first connection, the first connection is a connection to be established between the first OpenFlow switch and the OpenFlow controller, and the first response message corresponds to the first message;

a receiver configured to receive the first response message.

On another aspect, an OpenFlow controller is provided in an embodiment of the present invention, comprising:

a receiver and a transmitter, wherein the receiver is configured to receive a first message sent from a first OpenFlow switch;

the transmitter comprises a determination unit and a transmission unit, wherein, the determination unit is configured to determine according to the first message whether the first OpenFlow switch is under the management of the OpenFlow controller;

the transmission unit is configured to send a first response message to the first OpenFlow switch when the determination unit determines that the first OpenFlow switch is under the management of the OpenFlow controller, wherein the first response message corresponds to the first message;

the receiver is further configured to receive a second message sent from the first OpenFlow switch, wherein the second message comprises type information of a first connection and parameters related to the first OpenFlow switch among parameters of the first connection, and the first connection is a connection to be established between the first OpenFlow switch and the OpenFlow controller.

On another aspect, a first OpenFlow switch is provided in an embodiment of the present invention, comprising:

a receiver and a transmitter, wherein, the transmitter is configured to transmit a first message to an OpenFlow controller, so that when the OpenFlow controller determines according to the first message that the first OpenFlow switch is under the management of the OpenFlow controller, the OpenFlow controller sends a first response message to the first OpenFlow switch, wherein the first response message corresponds to the first message;

the receiver is configured to receive the first response message; and the transmitter is further configured to transmit a second message to the OpenFlow controller, wherein the second message comprises type information of a first connection and parameters related to the first OpenFlow switch among parameters of the first connection, and the first connection is a connection to be established between the first OpenFlow switch and the OpenFlow controller.

On another aspect, an OpenFlow controller is provided in an embodiment of the present invention, comprising:

a receiver and a transmitter, wherein, the receiver is configured to receive a first message sent from a first OpenFlow switch;

the transmitter comprises a determination unit and a transmission unit, wherein, the determination unit is configured to determine according to the first message whether the first OpenFlow switch is under the management of the OpenFlow controller;

the transmission unit is configured to send a first response message to the first OpenFlow switch when the determination unit determines that the first OpenFlow switch is under the management of the OpenFlow controller, wherein the first response message corresponds to the first message; and the transmitter is further configured to transmit a second message to the first OpenFlow switch, wherein the second message comprises type information of a first connection and parameters related to the OpenFlow controller among parameters of the first connection, and the first connection is a connection to be established between the first OpenFlow switch and the OpenFlow controller.

On another aspect, a first OpenFlow switch is provided in an embodiment of the present invention, comprising:

a receiver and a transmitter, wherein, the transmitter is configured to transmit a first message to an OpenFlow controller, so that when the OpenFlow controller determines according to the first message that the first OpenFlow switch is under the management of the OpenFlow controller, the OpenFlow controller sends a first response message to the first OpenFlow switch, wherein the first response message corresponds to the first message;

the receiver is configured to receive the first response message; and the receiver is further configured to receive a second message sent from the OpenFlow controller, wherein the second message comprises type information of a first connection and parameters related to the OpenFlow controller among parameters of the first connection, and the first connection is a connection to be established between the first OpenFlow switch and the OpenFlow controller.

On another aspect, an OpenFlow controller is provided in an embodiment of the present invention, comprising:

a receiver and a transmitter, wherein, the receiver is configured to receive a first message sent from a first OpenFlow switch;

the transmitter comprises a determination unit and a transmission unit, wherein, the determination unit is configured to determine according to the first message whether the first OpenFlow switch is under the management of the OpenFlow controller;

the transmission unit is configured to send a first response message to the first OpenFlow switch when the determination unit determines that the first OpenFlow switch is under the management of the OpenFlow controller, wherein the first response message corresponds to the first message;

the transmitter is further configured to transmit a second message to the first OpenFlow switch, wherein the second message comprises type information of a first connection and parameters related to the OpenFlow controller among parameters of the first connection, and the first connection is a connection to be established between the first OpenFlow switch and the OpenFlow controller; and the receiver is further configured to receive a second response message sent from the first OpenFlow switch, wherein the second response message comprises parameters related to the first OpenFlow switch among the parameters of the first connection, and the second response message corresponds to the second message.

On another aspect, a first OpenFlow switch is provided in an embodiment of the present invention, comprising:

a receiver and a transmitter, wherein, the transmitter is configured to transmit a first message to an OpenFlow controller, so that when the OpenFlow controller determines according to the first message that the first OpenFlow switch is under the management of the OpenFlow controller, the OpenFlow controller sends a first response message to the first OpenFlow switch, wherein the first response message corresponds to the first message;

the receiver is configured to receive the first response message;

the receiver is further configured to receive a second message sent from the OpenFlow controller, wherein the second message comprises type information of a first connection and parameters related to the OpenFlow controller among parameters of the first connection, and the first connection is a connection to be established between the first OpenFlow switch and the OpenFlow controller; and the transmitter is further configured to transmit a second response message to the OpenFlow controller, wherein the second response message comprises parameters related to the first OpenFlow switch among the parameters of the first connection, and the second response message corresponds to the second message.

On another aspect, an OpenFlow controller is provided in an embodiment of the present invention, comprising:

a receiver and a transmitter, wherein, the receiver is configured to receive a first message sent from a first OpenFlow switch;

the transmitter comprises a determination unit and a transmission unit, wherein, the determination unit is configured to determine according to the first message whether the first OpenFlow switch is under the management of the OpenFlow controller;

the transmission unit is configured to send a first response message to the first OpenFlow switch when the determination unit determines the first OpenFlow switch is under the management of the OpenFlow controller, wherein the first response message corresponds to the first message;

the receiver is further configured to receive a second message sent from the first OpenFlow switch, wherein the second message comprises type information of a first connection and parameters related to the first OpenFlow switch among parameters of the first connection, and the first connection is a connection to be established between the first OpenFlow switch and the OpenFlow controller; and the transmitter is further configured to transmit a second response message to the first OpenFlow switch, wherein the second response message comprises parameters related to the OpenFlow controller among the parameters of the first connection.

On another aspect, a first OpenFlow switch is provided in an embodiment of the present invention, comprising:

a receiver and a transmitter, wherein, the transmitter is configured to transmit a first message to an OpenFlow controller, so that when the OpenFlow controller determines according to the first message that the first OpenFlow switch is under the management of the OpenFlow controller, and the OpenFlow controller sends a first response message to the first OpenFlow switch, wherein the first response message corresponds to the first message;

the receiver is configured to receive the first response message;

the transmitter is further configured to transmit a second message to the OpenFlow controller, wherein the second message comprises type information of a first connection and parameters related to the first OpenFlow switch among parameters of the first connection, and the first connection is a connection to be established between the first OpenFlow switch and the OpenFlow controller; and the receiver is further configured to receive a second response message sent from the OpenFlow controller, wherein the second response message comprises parameters related to the OpenFlow controller among the parameters of the first connection.

It can be seen that, with the technical solutions of embodiments of the present invention, before initiating a connection establishment request to an OpenFlow controller (or an OpenFlow switch) by an OpenFlow switch (or an OpenFlow controller), the OpenFlow switch (or the OpenFlow controller) receives a message sent from the peer end, the message contains parameters related to the peer end among parameters of the connection to be established.

The above mechanism may achieve configuring parameters for the connection to be established automatically. Therefore, the technical solutions provided in embodiments of the present invention enable acquiring the parameters for the connection to be established automatically. The OpenFlow switch or the OpenFlow controller can establish a connection between the OpenFlow controller and the OpenFlow switch according to the parameters acquired automatically.

BRIEF DESCRIPTION OF THE DRAWINGS

For a more explicit description of the technical solutions of embodiments of the present invention, a brief introduction of accompanying drawings necessary to describe the embodiments or the prior art will be given below. Obviously, accompanying drawings described below are merely some embodiments of the present invention, and for those skilled in the art, other accompanying drawings can be derived from these ones without any creative efforts.

DETAILED DESCRIPTION

For a better understanding of the objects, the technical solutions and the advantages of the embodiments of the present invention, a clear and complete description of technical solutions of embodiments of the present invention will be given in connection with accompanying drawings of embodiments of the present invention. Obviously, embodiments described herein are merely some embodiments of the present invention, but not all of them. Based on those embodiments of the present invention, other embodiments can occur to those skilled in the art without any creative efforts, all of which fall within the scope of the present invention.

Embodiment 1

Figure 1:
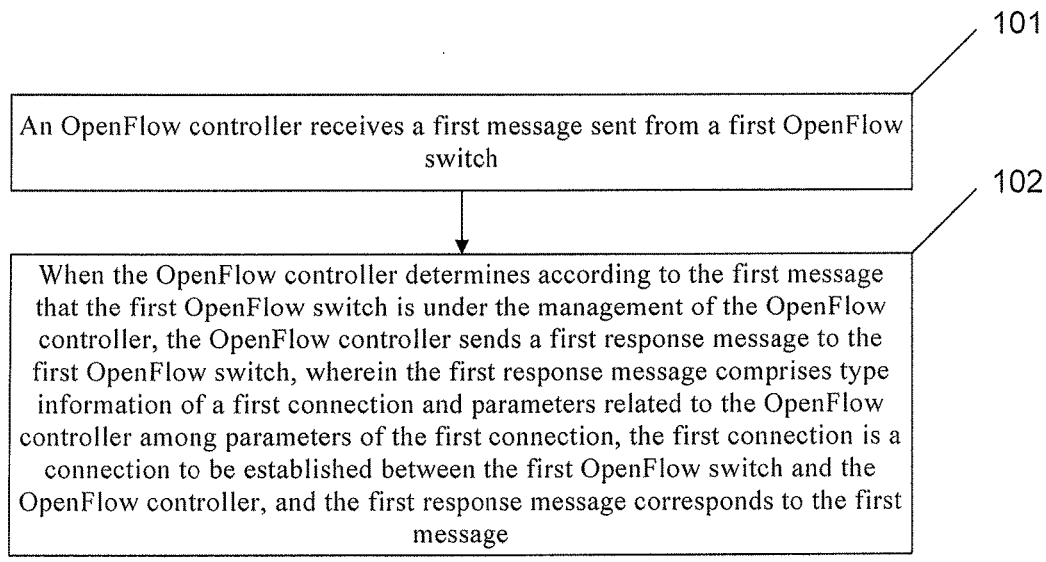
FIG. 1 is a flowchart of a message transmitting method provided in an embodiment of the present invention.

A message transmitting method is provided in an embodiment of the present invention, capable of automatically acquiring parameters of a connection to be established. Referring to FIG. 1, FIG. 1 is a flowchart of a message transmitting method provided in an embodiment of the present invention. The method comprises the following steps.

101: an OpenFlow controller receives a first message sent from a first OpenFlow switch.

The OpenFlow controller is a network device in an OpenFlow network. The OpenFlow controller may control the OpenFlow network. The OpenFlow controller may deliver a flow table to an OpenFlow switch.

The OpenFlow switch is also a network device in an OpenFlow network. The OpenFlow switch may forward messages according to the flow table.

For OpenFlow controllers, OpenFlow switches and OpenFlow networks, a reference can be made to the OpenFlow Switch Specification Version 1.0 published by the OFN (OpenFlow Networking Foundation).

The first OpenFlow switch transmits the first message to the OpenFlow controller.

The first OpenFlow switch may transmit the first message in a manner of broadcast. In such a scenario, the first message can be received in a complete broadcast domain. The OpenFlow controller is located in the broadcast domain.

The first OpenFlow switch may send the first message in a manner of multicast. In such a scenario, all members of a multicast group can receive the first message. When the OpenFlow controller is a member of the multicast group, the OpenFlow controller can receive the first message transmitted by the first OpenFlow switch in a manner of multicast as well. In a specific implementation, the first OpenFlow switch can transmit the first message in a manner of broadcast on all ports of the first OpenFlow switch according to an OFDP (OpenFlow Discovery Protocol) distributed by the GENI (Global Environment for Network Innovations). The OFDP is a protocol based on the LLDP (Link Layer Discovery Protocol).

The first message may comprise a source MAC (Media Access Control) protocol address, which is a MAC protocol address of the first OpenFlow switch.

The OpenFlow controller can receive the first message in the following manner.

A second OpenFlow switch establishes a controller channel with the OpenFlow controller. The first OpenFlow switch transmits the first message in a manner of broadcast or a manner of multicast, wherein when the first message is a broadcast message, the OpenFlow controller is located in a broadcast domain; when the first message is a multicast message, the OpenFlow controller is a member of a multicast group. After the first message has reached the second OpenFlow switch, the second OpenFlow switch may forward the first message to the OpenFlow controller through the controller channel. For the controller channel, a reference can be made to the OpenFlow Switch Specification Version 1.0 published by the OFN.

The following technical effects can be produced by the above solution.

In the case of having no knowledge about the location of the OpenFlow controller, the first OpenFlow switch can transmit the first message in a manner of broadcast or a manner of multicast. The first message can be transmitted within a complete broadcast domain or a multicast group through the broadcast or multicast, and finally reaches the OpenFlow controller. Since the first OpenFlow switch does not know a path to the OpenFlow controller, a longer period of time may be required for the first message to reach the OpenFlow controller.

The second OpenFlow switch knows the path to the OpenFlow controller, and thus the second OpenFlow switch forwarding the first message to the OpenFlow controller through the control channel may need a relatively smaller amount of time.

102: When the OpenFlow controller determines according to the first message that the first OpenFlow switch is under the management of the OpenFlow controller, the OpenFlow controller sends a first response message to the first OpenFlow switch, wherein the first response message comprises type information of a first connection and parameters related to the OpenFlow controller among parameters of the first connection, the first connection is a connection to be established between the first OpenFlow switch and the OpenFlow controller, and the first response message corresponds to the first message.

The OpenFlow controller can determine according to the first message whether the first OpenFlow switch is under the management of the OpenFlow controller in various manners. There are many methods for determination, and the present invention does not have limitation thereof. Two determination methods are provided below.

First Determination Method

The OpenFlow controller can access a database comprising IDs of OpenFlow switches managed by the OpenFlow controller. The first message comprises an ID of the first OpenFlow switch. When the OpenFlow controller detects the ID of the first OpenFlow switch in the database, the OpenFlow controller determines that the first OpenFlow switch is under the management thereof.

Second Determination Method

The first message comprises an ID of a first OpenFlow controller. When the first OpenFlow controller determines that an OpenFlow controller corresponding to the ID of the first OpenFlow controller comprised in the first message is the first OpenFlow controller, the first OpenFlow controller determines that the first OpenFlow switch is under the management of the OpenFlow controller.

When the OpenFlow controller determines according to the first message that the first OpenFlow switch is under the management of the OpenFlow controller, the OpenFlow controller transmits a first response message to the first OpenFlow switch. The first response message corresponds to the first message. In a specific implementation, the OpenFlow controller transmits the first response message to the first OpenFlow switch in a manner of unicast. In such a scenario, the destination MAC protocol address of the first response message is the MAC protocol address of the first OpenFlow switch.

The first response message can supply parameters for a connection to be established between the first OpenFlow switch and the OpenFlow controller. The connection between the first OpenFlow switch and the OpenFlow controller is a first connection. The first connection may be a TCP (Transmission Control Protocol) or SSL (Secure Sockets Layer) connection, and the present invention does not have limitation thereof.

The first response message comprises type information of the first connection. The type information of the first connection is used to identify the type of the first connection. In a specific implementation, the type information of the first connection can be carried on a field or several fields in the first response message.

The first response message comprises parameters related to the OpenFlow controller among parameters of the first connection. The parameters of the first connection are a set of parameters required in the establishment of the first connection. For example, when the type of the first connection is TCP, the parameters of the first connection comprise an IP (Internet Protocol) address of the OpenFlow controller, an IP address of the first OpenFlow switch, a manner in which the TCP connection will be established, a TCP port number of the OpenFlow controller, and a TCP port number of the first OpenFlow switch. Wherein, the TCP connection establishment manner may be establishing a connection actively or establishing a connection passively.

The parameters of the first connection comprise parameters related to the OpenFlow controller and parameters related to the first OpenFlow switch. When the type of the first connection is a TCP connection, the parameters related to the OpenFlow controller among the parameters of the first connection comprise an IP address of the OpenFlow controller and a TCP port number of the OpenFlow controller; the parameters related to the first OpenFlow switch among the parameters of the first connection comprise an IP address of the first OpenFlow switch and a TCP port number of the first OpenFlow switch.

It can be seen that, with the technical solution of this embodiment of the present invention, the message sent from the OpenFlow controller to the OpenFlow switch comprises parameters related to the OpenFlow controller among parameters of the connection to be established. The OpenFlow switch can automatically acquire the parameters of the connection to be established through receiving the message sent by the OpenFlow controller.

The above mechanism achieves configuring parameters for a connection to be established automatically. The OpenFlow switch can establish a connection between the OpenFlow switch and the OpenFlow controller according to the parameters acquired automatically.

Optionally, in the method provided in this embodiment, the following step can be comprised after step 102.

103: The OpenFlow controller performs actions of establishing the first connection, the actions including responding to an establishment request for the first connection initiated by the first OpenFlow switch according to the type information of the first connection and the parameters related to the OpenFlow controller among the parameters of the first connection.

The actions of establishing the first connection can be defined by a technical standard corresponding to the first connection. For example, a standard corresponding to TCP defines actions required for the establishment of a TCP connection. In general, the actions of establishing the first connection at least comprise transmitting an establishment request for the first connection and responding to the establishment request for the first connection. Wherein, transmitting the establishment request for the first connection means transmitting a request of establishing the first connection from one side initiating the establishment of the first connection to another side receiving the request of establishing the first connection. Responding to the establishment request for the first connection refers to responding to the request of establishing the first connection by the receiving side of the request of establishing the first connection and transmitting a response to the initiating side of the establishment of the first connection.

In a specific implementation, the initiating side of the establishment of the first connection may be the first OpenFlow switch or the OpenFlow controller. When the type of the first connection is a TCP connection, the initiating side of the first connection depends on the manner of establishing the TCP connection.

In the embodiment of the present invention, the establishment request for the first connection is initiated by the first OpenFlow switch. Specially, the first OpenFlow switch initiates an establishment request for the first connection according to the type information of the first connection and the parameters related to the OpenFlow controller among the parameters of the first connection. After the first OpenFlow switch receives the establishment request for the first connection, the first OpenFlow switch responds to the establishment request for the first connection.

Embodiment 2

Figure 2:
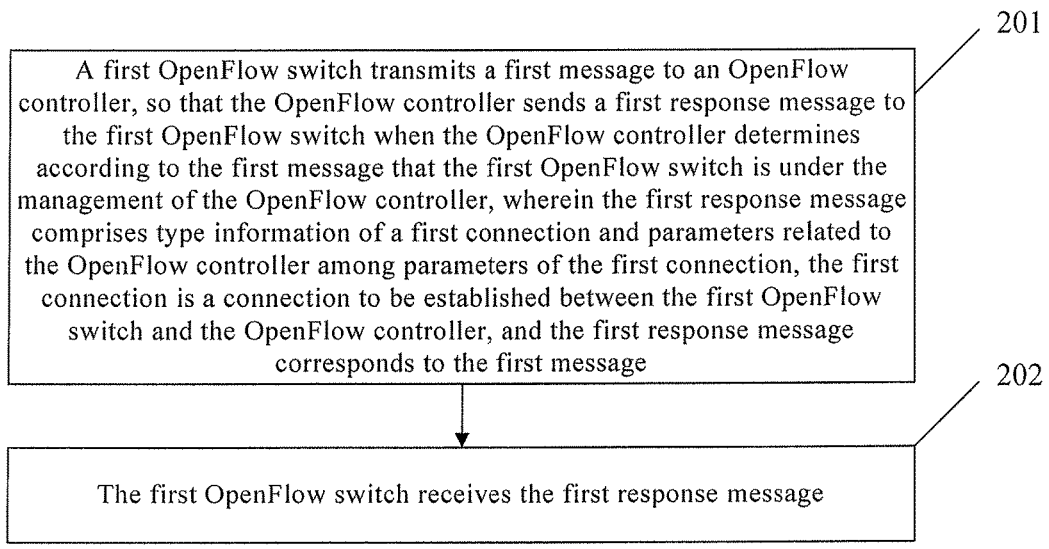
FIG. 2 is a flowchart of a message receiving method provided in an embodiment of the present invention.

A message receiving method is provided in an embodiment of the present invention, capable of automatically acquiring parameters of a connection to be established. Referring to FIG. 2, FIG. 2 is a flowchart of a message receiving method provided in an embodiment of the present invention. The method comprises the following steps.

201: A first OpenFlow switch transmits a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message comprises type information of a first connection and parameters related to the OpenFlow controller among parameters of the first connection, the first connection is a connection to be established between the first OpenFlow switch and the OpenFlow controller, and the first response message corresponds to the first message.

In a specific implementation, steps 101 and 102 of Embodiment 1 can be referenced.

202: The first OpenFlow switch receives the first response message.

In a specific implementation, step 102 of Embodiment 1 can be referenced.

Optionally, after step 202, the method provided in this embodiment may further comprise the following step.

203: The first OpenFlow switch performs actions of establishing the first connection, the actions including initiating an establishment request for the first connection to the OpenFlow controller according to the type information of the first connection and the parameters related to the OpenFlow controller among the parameters of the first connection.

In a specific implementation, step 103 of Embodiment 1 can be referenced.

Embodiment 3

Figure 3:
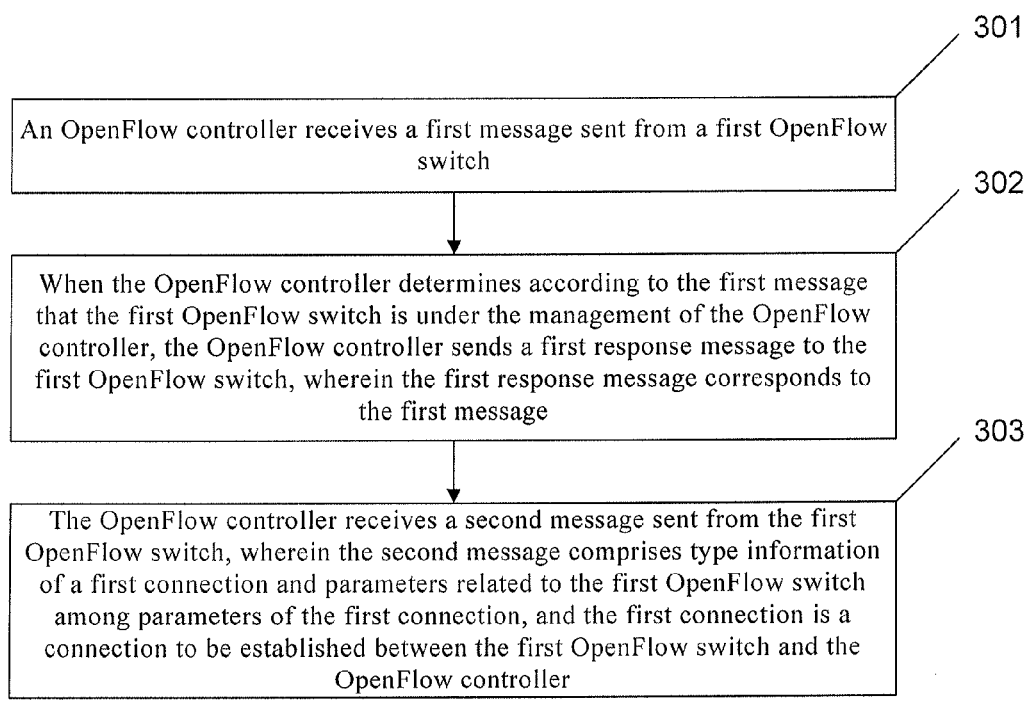
FIG. 3 is a flowchart of another message transmitting method provided in an embodiment of the present invention.

Another message transmitting method is provided in an embodiment of the present invention, capable of automatically acquiring parameters of a connection to be established. Referring to FIG. 3, FIG. 3 is a flowchart of a message transmitting method provided in an embodiment of the present invention. The method comprises the following steps.

301: An OpenFlow controller receives a first message sent from a first OpenFlow switch.

In a specific implementation, step 101 of Embodiment 1 can be referenced.

302: When the OpenFlow controller determines according to the first message that the first OpenFlow switch is under the management of the OpenFlow controller, the OpenFlow controller sends a first response message to the first OpenFlow switch, wherein the first response message corresponds to the first message.

In a specific implementation, step 102 of Embodiment 1 can be referenced.

Different from step 102 of Embodiment 1, the first response message of this embodiment comprise neither type information of a first connection, nor the parameters related to the OpenFlow controller among parameters of the first connection.

303: the OpenFlow controller receives a second message sent from the first OpenFlow switch, wherein the second message comprises type information of a first connection and parameters related to the first OpenFlow switch among parameters of the first connection, and the first connection is a connection to be established between the first OpenFlow switch and the OpenFlow controller.

In the scenario of the OpenFlow controller initiating an establishment request for the first connection, the OpenFlow controller has to know parameters related to the first OpenFlow switch among parameters of the first connection, so that the OpenFlow controller can communicate with the first OpenFlow switch. When the type of the first connection is TCP, the parameters related to the first OpenFlow switch among the parameters of the first connection comprise an IP address of the first OpenFlow switch and a TCP port number of the first OpenFlow switch.

Optionally, after step 303, the method provided in this embodiment may further comprise the following step.

304: The OpenFlow controller performs actions of establishing the first connection, the actions including initiating an establishment request for the first connection to the first OpenFlow switch according to the type information of the first connection and the parameters related to the first OpenFlow switch among the parameters of the first connection.

In a specific implementation, step 103 of Embodiment 1 can be referenced.

Embodiment 4

Figure 4:
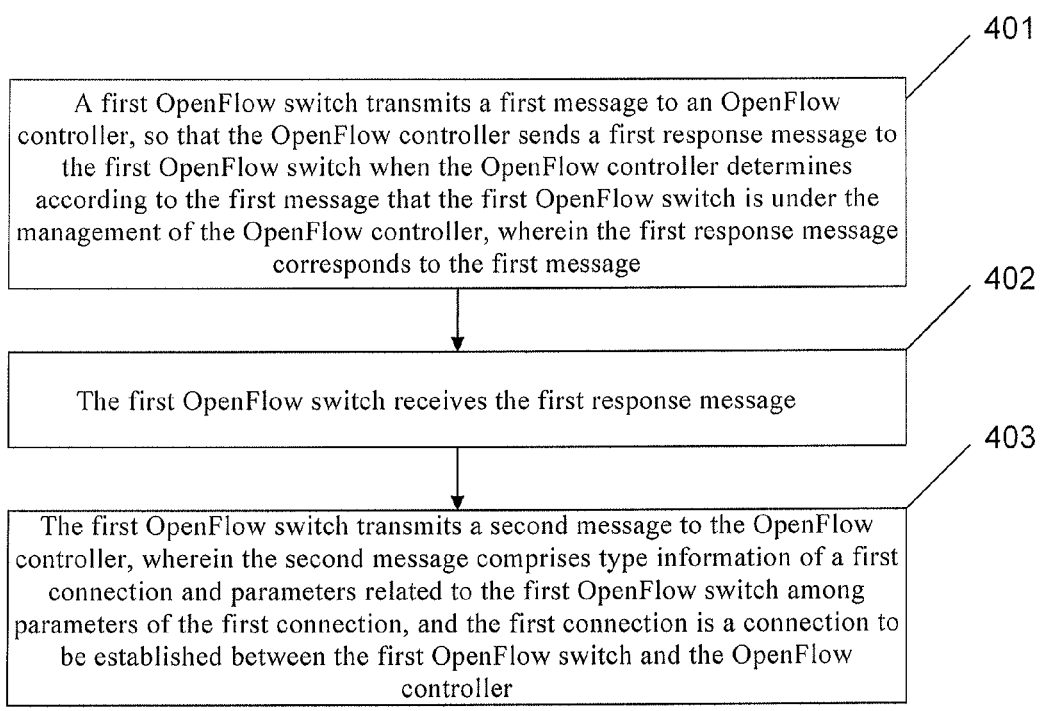
FIG. 4 is a flowchart of another message receiving method provided in an embodiment of the present invention.

Another message receiving method is provided in an embodiment of the present invention, capable of automatically acquiring parameters of a connection to be established. Referring to FIG. 4, FIG. 4 is a flowchart of a message receiving method provided in an embodiment of the present invention. The method comprises the following steps.

401: A first OpenFlow switch transmits a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message corresponds to the first message.

In a specific implementation, steps 301 and 302 of Embodiment 3 can be referenced.

402: The first OpenFlow switch receives the first response message.

In a specific implementation, step 302 of Embodiment 3 can be referenced.

403: The first OpenFlow switch transmits a second message to the OpenFlow controller, wherein the second message comprises type information of a first connection and parameters related to the first OpenFlow switch among parameters of the first connection, and the first connection is a connection to be established between the first OpenFlow switch and the OpenFlow controller.

In a specific implementation, step 303 of Embodiment 3 can be referenced.

Optionally, after step 403, the method provided in this embodiment may further comprise the following step.

404: The first OpenFlow switch performs actions of establishing the first connection, the actions including responding to an establishment request for the first connection initiated by the OpenFlow controller according to the type information of the first connection and the parameters related to the OpenFlow controller among the parameters of the first connection.

In a specific implementation, step 304 of Embodiment 3 can be referenced.

Embodiment 5

Figure 5:
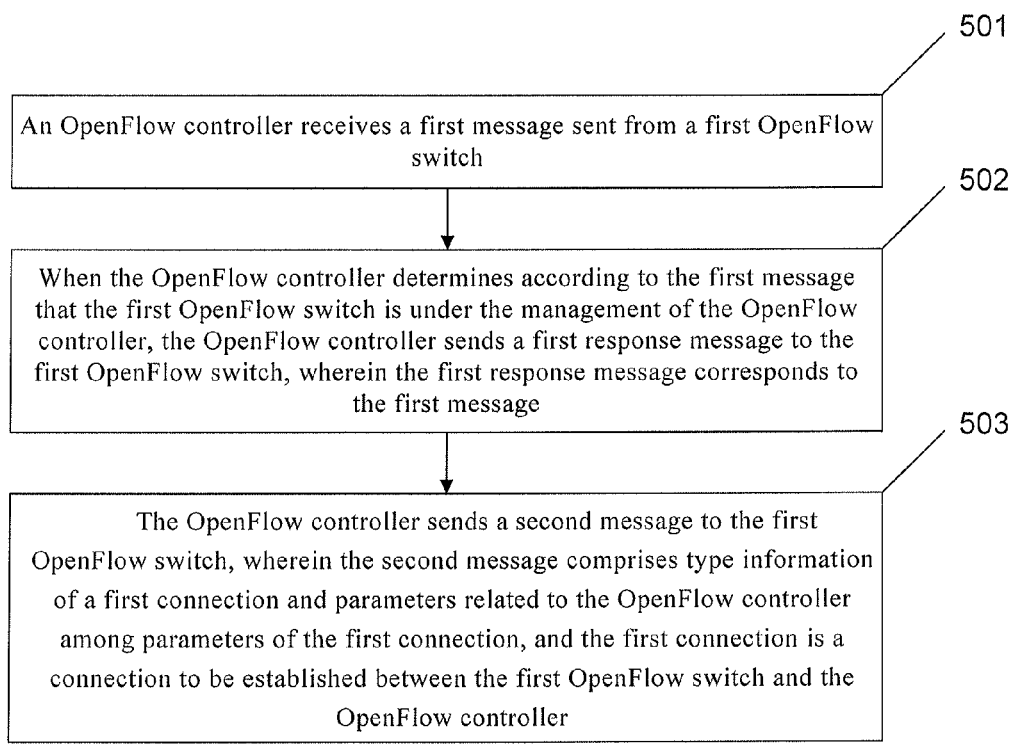
FIG. 5 is a flowchart of another message transmitting method provided in an embodiment of the present invention.

Another message transmitting method is provided in an embodiment of the present invention, capable of automatically acquiring parameters of a connection to be established. Referring to FIG. 5, FIG. 5 is a flowchart of a message transmitting method provided in an embodiment of the present invention. The method comprises the following steps.

501: An OpenFlow controller receives a first message sent from a first OpenFlow switch.

In a specific implementation, step 101 of Embodiment 1 can be referenced.

502: When the OpenFlow controller determines according to the first message that the first OpenFlow switch is under the management of the OpenFlow controller, the OpenFlow controller sends a first response message to the first OpenFlow switch, wherein the first response message corresponds to the first message.

In a specific implementation, step 102 of Embodiment 1 can be referenced.

Different from Embodiment 1, the first response message of this embodiment does not comprise type information of a first connection and parameters related to the OpenFlow controller among parameters of the first connection.

503: The OpenFlow controller sends a second message to the first OpenFlow switch, wherein the second message comprises type information of a first connection and parameters related to the OpenFlow controller among parameters of the first connection, and the first connection is a connection to be established between the first OpenFlow switch and the OpenFlow controller.

In a specific implementation, step 303 of Embodiment 3 can be referenced.

Different from Embodiment 3, the second message is sent by the OpenFlow controller in this embodiment. Moreover, the second message comprises type information of a first connection and parameters related to the OpenFlow controller among parameters of the first connection.

Optionally, after step 503, the method provided in this embodiment may further comprise the following step.

504: The OpenFlow controller performs actions of establishing the first connection, the actions including responding to an establishment request for the first connection initiated by the first OpenFlow switch according to the type information of the first connection and the parameters related to the OpenFlow controller among the parameters of the first connection.

In a specific implementation, step 304 of Embodiment 3 can be referenced.

Different from Embodiment 3, the establishment request for the first connection is initiated by the first OpenFlow switch in this embodiment.

Embodiment 6

Figure 6:
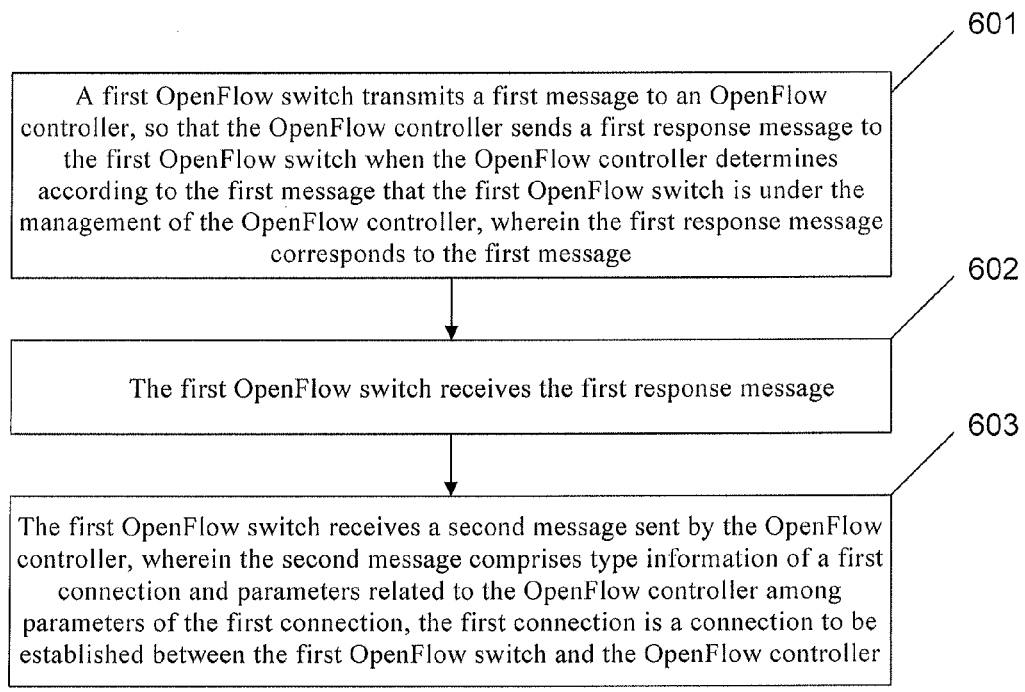
FIG. 6 is a flowchart of another message receiving method provided in an embodiment of the present invention.

Another message receiving method is provided in an embodiment of the present invention, capable of automatically acquiring parameters of a connection to be established. Referring to FIG. 6, FIG. 6 is a flowchart of a message receiving method provided in an embodiment of the present invention. The method comprises the following steps.

601: A first OpenFlow switch transmits a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message corresponds to the first message.

In a specific implementation, steps 501 and 502 of Embodiment 5 can be referenced.

602: The first OpenFlow switch receives the first response message.

In a specific implementation, step 502 of Embodiment 5 can be referenced.

603: The first OpenFlow switch receives a second message sent by the OpenFlow controller, wherein the second message comprises type information of a first connection and parameters related to the OpenFlow controller among parameters of the first connection, and the first connection is a connection to be established between the first OpenFlow switch and the OpenFlow controller.

In a specific implementation, step 503 of Embodiment 5 can be referenced.

Optionally, after step 503, the method provided in this embodiment may further comprise the following step.

604: The first OpenFlow switch performs actions of establishing the first connection, the actions including initiating an establishment request for the first connection to the OpenFlow controller according to the type information of the first connection and the parameters related to the OpenFlow controller among the parameters of the first connection.

In a specific implementation, step 504 of Embodiment 5 can be referenced.

Embodiment 7

Figure 7:
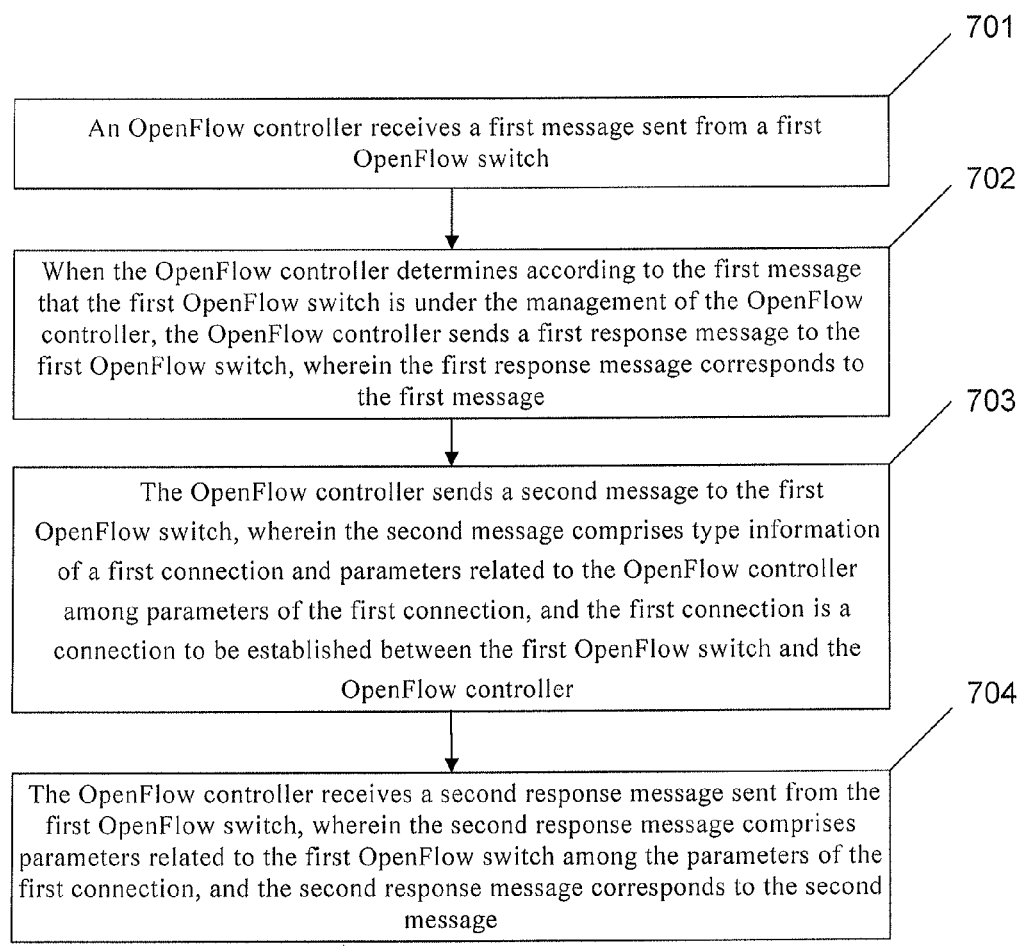
FIG. 7 is a flowchart of another message transmitting method provided in an embodiment of the present invention.

Another message transmitting method is provided in an embodiment of the present invention, capable of automatically acquiring parameters of a connection to be established. Referring to FIG. 7, FIG. 7 is a flowchart of a message transmitting method provided in an embodiment of the present invention. The method comprises the following steps.

701: An OpenFlow controller receives a first message sent from a first OpenFlow switch.

In a specific implementation, step 101 of Embodiment 1 can be referenced.

702: When the OpenFlow controller determines according to the first message that the first OpenFlow switch is under the management of the OpenFlow controller, it sends a first response message to the first OpenFlow switch, wherein the first response message corresponds to the first message.

In a specific implementation, step 102 of Embodiment 1 can be referenced.

703: The OpenFlow controller sends a second message to the first OpenFlow switch, wherein the second message comprises type information of a first connection and parameters related to the OpenFlow controller among parameters of the first connection, and the first connection is a connection to be established between the first OpenFlow switch and the OpenFlow controller.

In a specific implementation, step 503 of Embodiment 5 can be referenced.

704: the OpenFlow controller receives a second response message sent from the first OpenFlow switch, wherein the second response message comprises parameters related to the first OpenFlow switch among the parameters of the first connection, and the second response message corresponds to the second message.

In the scenario of initiating an establishment request for the first connection by the OpenFlow controller, the OpenFlow controller has to know parameters related to the first OpenFlow switch among parameters of the first connection, so that the OpenFlow controller can communicate with the first OpenFlow switch. When the type of the first connection is TCP, the parameters related to the first OpenFlow switch among the parameters of the first connection comprise an IP address of the first OpenFlow switch and a TCP port number of the first OpenFlow switch.

Optionally, after step 704, the method provided in this embodiment may further comprise the following step.

705: The OpenFlow controller performs actions of establishing the first connection, the actions including responding to an establishment request for the first connection initiated by the first OpenFlow switch according to the type information of the first connection, the parameters related to the first OpenFlow switch among the parameters of the first connection, and the parameters related to the OpenFlow controller among the parameters of the first connection.

The first OpenFlow switch can acquire the type information of the first connection and the parameters related to the OpenFlow controller among the parameters of the first connection, and thus the establishment request for the first connection can be initiated by the first OpenFlow switch.

In a specific implementation, step 103 of Embodiment 1 can be referenced.

Optionally, after step 704, the method provided in this embodiment may further comprise the following step.

706: The OpenFlow controller performs actions of establishing the first connection, the actions including initiating an establishment request for the first connection to the first OpenFlow switch according to the type information of the first connection, the parameters related to the first OpenFlow switch among the parameters of the first connection, and the parameters related to the OpenFlow controller among the parameters of the first connection.

The OpenFlow controller can acquire the type information of the first connection and the parameters related to the first OpenFlow switch among the parameters of the first connection, and thus the establishment request for the first connection can be initiated by the OpenFlow controller.

In a specific implementation, step 103 of Embodiment 1 can be referenced.

Different from Embodiment 1, the establishment request for the first connection can be initiated by the OpenFlow controller in this embodiment.

Embodiment 8

Figure 8:
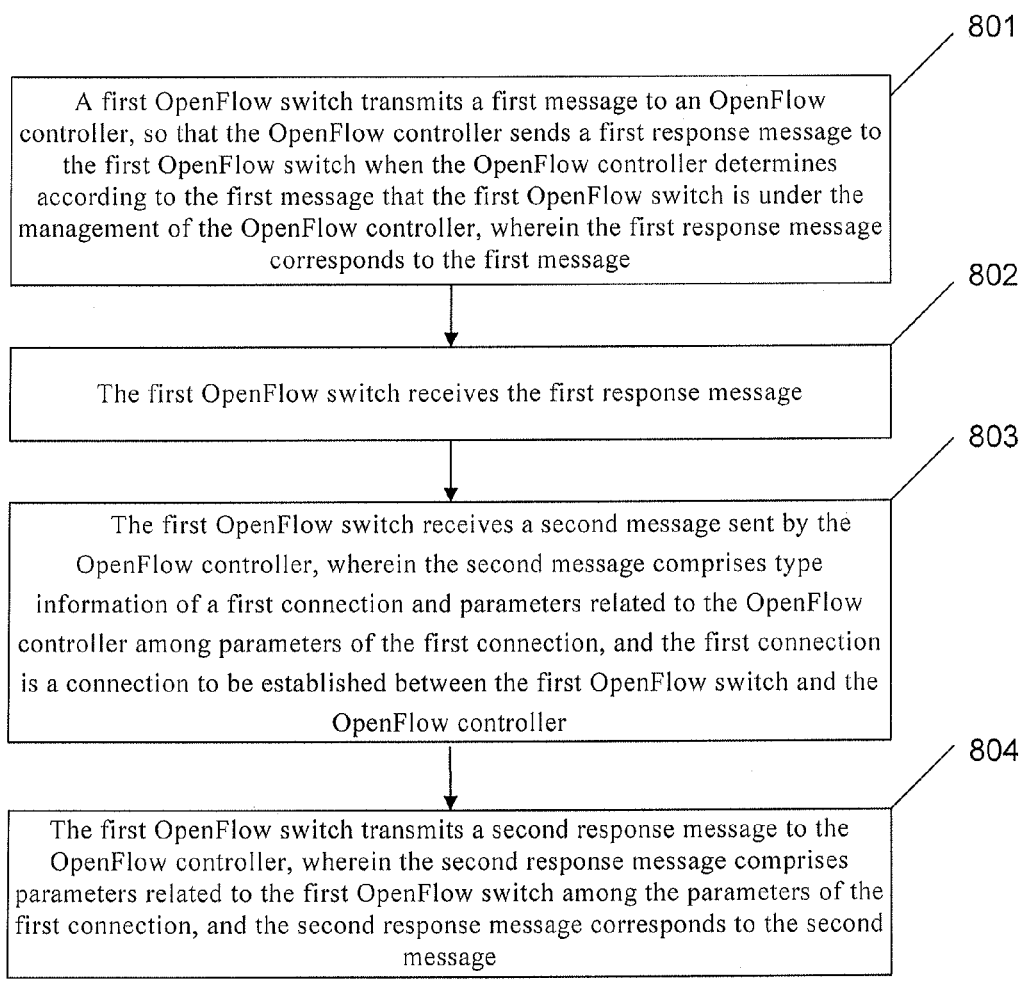
FIG. 8 is a flowchart of another message receiving method provided in an embodiment of the present invention.

Another message receiving method is provided in an embodiment of the present invention, capable of automatically acquiring parameters of a connection to be established. Referring to FIG. 8, FIG. 8 is a flowchart of a message receiving method provided in an embodiment of the present invention. The method comprises the following steps.

801: A first OpenFlow switch transmits a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message corresponds to the first message.

In a specific implementation, steps 701 and 702 of Embodiment 7 can be referenced.

802: The first OpenFlow switch receives the first response message.

In a specific implementation, step 702 of Embodiment 7 can be referenced.

803: The first OpenFlow switch receives a second message sent by the OpenFlow controller, wherein the second message comprises type information of a first connection and parameters related to the OpenFlow controller among parameters of the first connection, and the first connection is a connection to be established between the first OpenFlow switch and the OpenFlow controller.

In a specific implementation, step 703 of Embodiment 7 can be referenced.

804: The first OpenFlow switch transmits a second response message to the OpenFlow controller, wherein the second response message comprises parameters related to the first OpenFlow switch among the parameters of the first connection, and the second response message corresponds to the second message.

In a specific implementation, step 704 of Embodiment 7 can be referenced.

Optionally, after step 804, the method provided in this embodiment may further comprise the following step.

805: The first OpenFlow switch performs actions of establishing the first connection, the actions including initiating an establishment request for the first connection to the OpenFlow controller according to the type information of the first connection, the parameters related to the first OpenFlow switch among the parameters of the first connection, and the parameters related to the OpenFlow controller among the parameters of the first connection.

In a specific implementation, step 706 of Embodiment 7 can be referenced.

Optionally, after step 804, the method provided in this embodiment may further comprise the following step.

806: The first OpenFlow switch performs actions of establishing the first connection, the actions including initiating an establishment request for the first connection to the OpenFlow controller according to the type information of the first connection, the parameters related to the first OpenFlow switch among the parameters of the first connection, and the parameters related to the OpenFlow controller among the parameters of the first connection.

In a specific implementation, step 705 of Embodiment 7 can be referenced.

Embodiment 9

Figure 9:
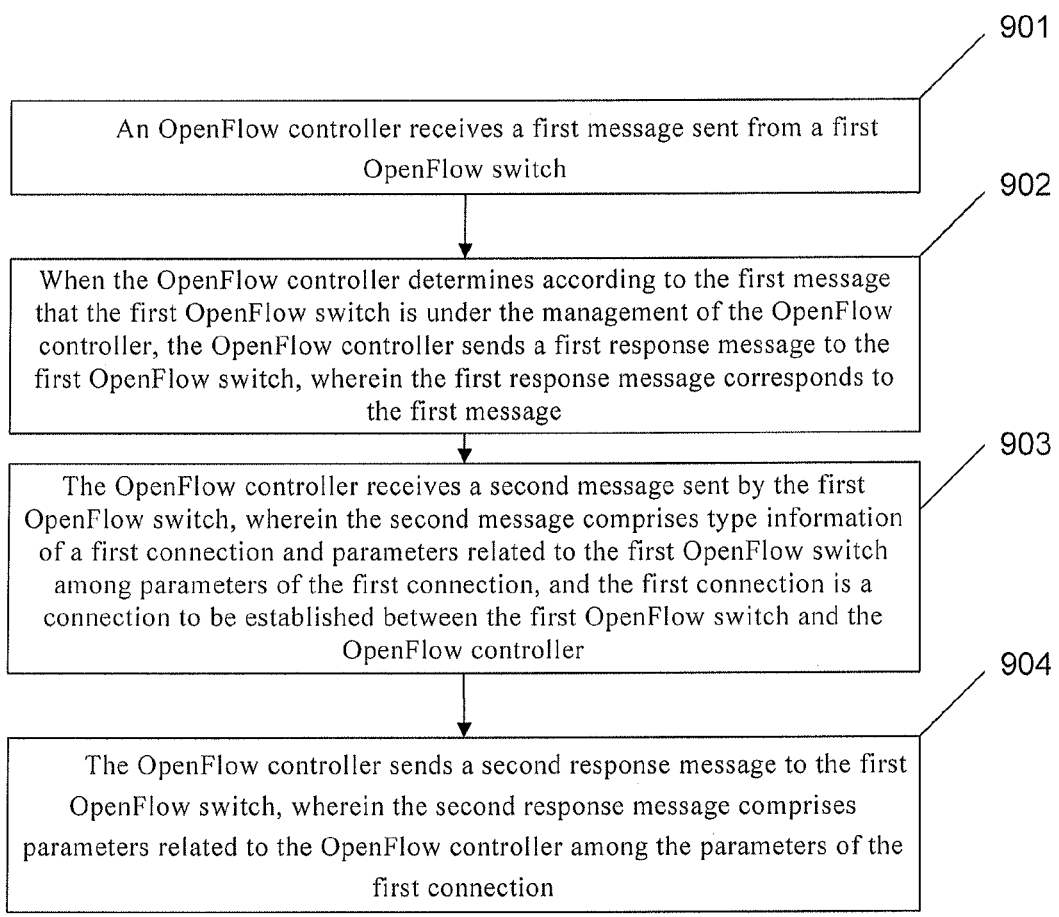
FIG. 9 is a flowchart of another message transmitting method provided in an embodiment of the present invention.

Another message transmitting method is provided in an embodiment of the present invention, capable of automatically acquiring parameters of a connection to be established. Referring to FIG. 9, FIG. 9 is a flowchart of a message transmitting method provided in an embodiment of the present invention. The method comprises the following steps.

901: An OpenFlow controller receives a first message sent from a first OpenFlow switch.

In a specific implementation, step 701 of Embodiment 7 can be referenced.

902: When the OpenFlow controller determines according to the first message that the first OpenFlow switch is under the management of the OpenFlow controller, the OpenFlow controller sends a first response message to the first OpenFlow switch, wherein the first response message corresponds to the first message.

In a specific implementation, step 702 of Embodiment 7 can be referenced.

903: The OpenFlow controller receives a second message sent by the first OpenFlow switch, wherein the second message comprises type information of a first connection and parameters related to the first OpenFlow switch among parameters of the first connection, and the first connection is a connection to be established between the first OpenFlow switch and the OpenFlow controller.

In a specific implementation, step 703 of Embodiment 7 can be referenced.

Different from embodiment 7, the second message is sent by the first OpenFlow switch in this embodiment. Furthermore, the second message comprises type information of a first connection and parameters related to the first OpenFlow switch among parameters of the first connection.

904: The OpenFlow controller sends a second response message to the first OpenFlow switch, wherein the second response message comprises parameters related to the OpenFlow controller among the parameters of the first connection.

In a specific implementation, step 704 of Embodiment 7 can be referenced.

Different from embodiment 7, the second response message is sent by the OpenFlow controller in this embodiment. Furthermore, the second message comprises type information of a first connection and parameters related to the OpenFlow controller among parameters of the first connection.

Optionally, after step 904, the method provided in this embodiment may further comprise the following step.

905: The OpenFlow controller performs actions of establishing the first connection, the actions including initiating an establishment request for the first connection to the first OpenFlow switch according to the type information of the first connection, the parameters related to the first OpenFlow switch among the parameters of the first connection, and the parameters related to the OpenFlow controller among the parameters of the first connection.

In a specific implementation, step 706 of Embodiment 7 can be referenced.

Optionally, after step 904, the method provided in this embodiment may further comprise the following step.

906: The OpenFlow controller performs actions of establishing the first connection, the actions including responding to an establishment request for the first connection initiated by the first OpenFlow switch according to the type information of the first connection, the parameters related to the first OpenFlow switch among the parameters of the first connection, and the parameters related to the OpenFlow controller among the parameters of the first connection.

In a specific implementation, step 705 of Embodiment 7 can be referenced.

Embodiment 10

Figure 10:
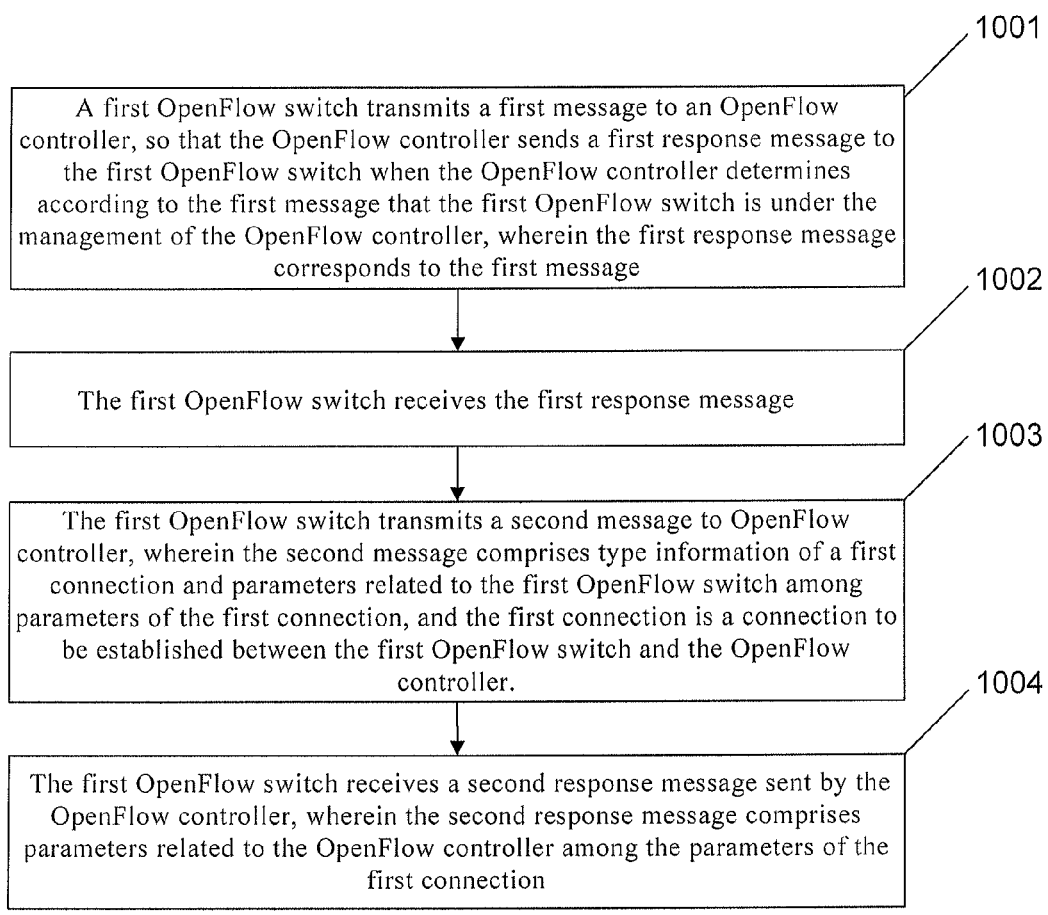
FIG. 10 is a flowchart of another message receiving method provided in an embodiment of the present invention.

Another message receiving method is provided in an embodiment of the present invention, capable of automatically acquiring parameters of a connection to be established. Referring to FIG. 10, FIG. 10 is a flowchart of a connection establishment method provided in an embodiment of the present invention. The method comprises the following steps.

1001: A first OpenFlow switch transmits a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message corresponds to the first message.

In a specific implementation, steps 901 and 902 of Embodiment 9 can be referenced.

1002: The first OpenFlow switch receives the first response message.

In a specific implementation, step 902 of Embodiment 9 can be referenced.

1003: The first OpenFlow switch transmits a second message to the OpenFlow controller, wherein the second message comprises type information of a first connection and parameters related to the first OpenFlow switch among parameters of the first connection, and the first connection is a connection to be established between the first OpenFlow switch and the OpenFlow controller.

In a specific implementation, step 903 of Embodiment 9 can be referenced.

1004: The first OpenFlow switch receives a second response message sent by the OpenFlow controller, wherein the second response message comprises parameters related to the OpenFlow controller among the parameters of the first connection.

In a specific implementation, step 904 of Embodiment 9 can be referenced.

Optionally, after step 1004, the method provided in this embodiment may further comprise the following step.

1005: The first OpenFlow switch performs actions of establishing the first connection, the actions including responding to an establishment request for the first connection initiated by the OpenFlow controller according to the type information of the first connection, the parameters related to the first OpenFlow switch among the parameters of the first connection, and the parameters related to the OpenFlow controller among the parameters of the first connection.

In a specific implementation, step 905 of Embodiment 9 can be referenced.

Optionally, after step 1004, the method provided in this embodiment may further comprise the following step.

1006: The first OpenFlow switch performs actions of establishing the first connection, the actions including responding to an establishment request for the first connection initiated by the OpenFlow controller according to the type information of the first connection, the parameters related to the first OpenFlow switch among the parameters of the first connection, and the parameters related to the OpenFlow controller among the parameters of the first connection.

In a specific implementation, step 906 of Embodiment 9 can be referenced.

Embodiment 11

Figure 11:
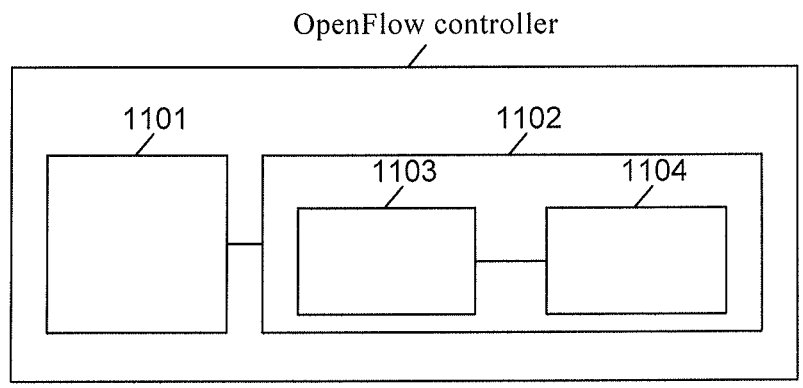
FIG. 11 is a schematic structure diagram of an OpenFlow controller provided in an embodiment of the present invention.

An OpenFlow controller is provided in an embodiment of the present invention, capable of automatically acquiring parameters of a connection to be established. Referring to FIG. 11, FIG. 11 is a schematic structure diagram of an OpenFlow controller provided in an embodiment of the present invention. The OpenFlow controller comprises:

a receiver 1101 and a transmitter 1102, wherein, the receiver 1101 is configured to receive a first message sent from a first OpenFlow switch;

the transmitter 1102 comprises a determination unit 1103 and a transmission unit 1104, wherein, the determination unit 1103 is configured to determine according to the first message whether the first OpenFlow switch is under the management of the OpenFlow controller;

the transmission unit 1104 is configured to send a first response message to the first OpenFlow switch when the determination unit 1103 determines that the first OpenFlow switch is under the management of the OpenFlow controller, wherein the first response message comprises type information of a first connection and parameters related to the OpenFlow controller among parameters of the first connection, the first connection is a connection to be established between the first OpenFlow switch and the OpenFlow controller, and the first response message corresponds to the first message.

Optionally, the determination unit 1103 specifically comprises a detection subunit and a first determination subunit, wherein, the detection subunit is configured to detect whether an ID of the first OpenFlow switch is comprised in a database, wherein the first message comprises the ID of the first OpenFlow switch, and the database comprises IDs of OpenFlow switches managed by the OpenFlow controller;

the first determination subunit is configured to determine that the first OpenFlow switch is under the management of the OpenFlow controller when the detection subunit detects that the ID of the first OpenFlow switch is comprised in the database.

Optionally, the determination unit 1103 specifically comprises a judgment subunit and a second determination subunit, wherein, the judgment subunit is configured to judge whether an OpenFlow controller corresponding to the ID of the first OpenFlow controller is the first OpenFlow controller, wherein the first message comprises the ID of the first OpenFlow switch;

the second determination subunit is configured to determine that the first OpenFlow switch is under the management of the OpenFlow controller when the judgment subunit determines that the OpenFlow controller corresponding to the ID of the first OpenFlow controller is the first OpenFlow controller.

Optionally, the receiver 1101 comprises a first receiving subunit; wherein, the first receiving subunit is configured to receive the first message forwarded by a second OpenFlow switch through a controller channel, the first message transmitted from the first OpenFlow switch in a manner of broadcast.

Optionally, the receiver 1101 comprises a second receiving subunit; wherein, the second receiving subunit is configured to receive the first message forwarded by a second OpenFlow switch through a controller channel, the first message transmitted from the first OpenFlow switch in a manner of multicast, wherein the OpenFlow controller is a member of a multicast group corresponding to the multicast.

Optionally, the OpenFlow controller further comprises an execution unit, which is configured to execute actions of establishing the first connection, the actions including responding to an establishment request for the first connection initiated by the first OpenFlow switch according to the type information of the first connection, and the parameters related to the OpenFlow controller among the parameters of the first connection.

The OpenFlow controller provided in this embodiment can be realized through the method provided in embodiment 1. In a specific implementation, embodiment 1 can be referenced.

Embodiment 12

Figure 12:
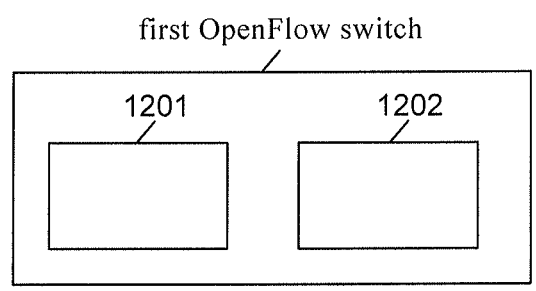
FIG. 12 is a schematic structure diagram of a first OpenFlow switch provided in an embodiment of the present invention.

A first OpenFlow switch is provided in an embodiment of the present invention, capable of automatically acquiring parameters of a connection to be established. Referring to FIG. 12, FIG. 12 is a schematic structure diagram of a first OpenFlow switch provided in an embodiment of the present invention. The first OpenFlow switch comprises:

a transmitter 1201 for transmitting a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message comprises type information of a first connection and parameters related to the OpenFlow controller among parameters of the first connection, the first connection is a connection to be established between the first OpenFlow switch and the OpenFlow controller, and the first response message corresponds to the first message; and a receiver 1202 for receiving the first response message.

Optionally, the transmitter specifically comprises a first transmission subunit for transmitting the first message in a manner of broadcast, so that a second OpenFlow switch forwards the first message to the first OpenFlow controller through a controller channel after receiving the first message.

Optionally, the transmitter specifically comprises a second transmission subunit for transmitting the first message in a manner of multicast, so that a second OpenFlow switch forwards the first message to the first OpenFlow controller through a controller channel after receiving the first message, wherein the OpenFlow controller is a member of a multicast group corresponding to the multicast.

Optionally, the first OpenFlow switch further comprises an execution unit for executing actions of establishing the first connection, the actions including initiating an establishment request for the first connection to the OpenFlow controller according to the type information of the first connection, and the parameters related to the OpenFlow controller among the parameters of the first connection.

The first OpenFlow switch provided in this embodiment can be realized through the method provided in embodiment 2. In a specific implementation, embodiment 2 can be referenced.

Embodiment 13

Figure 13:
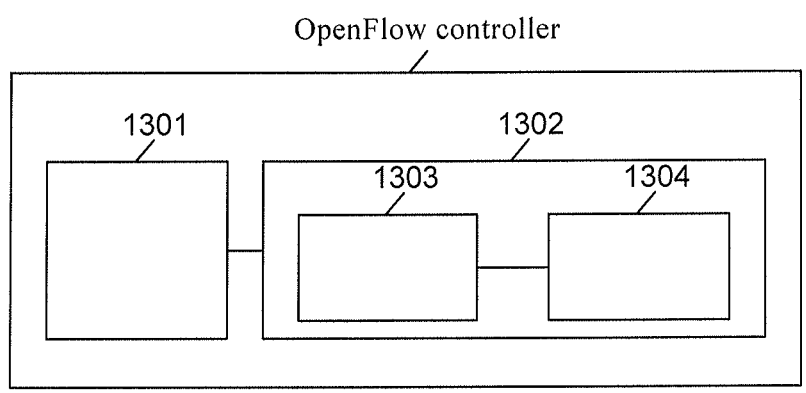
FIG. 13 is a schematic structure diagram of another OpenFlow controller provided in an embodiment of the present invention.

Another OpenFlow controller is provided in an embodiment of the present invention, capable of automatically acquiring parameters of a connection to be established. Referring to FIG. 13, FIG. 13 is a schematic structure diagram of an OpenFlow controller provided in an embodiment of the present invention. The OpenFlow controller comprises:

a receiver 1301 and a transmitter 1302, wherein, the receiver 1301 is configured to receive a first message sent from a first OpenFlow switch;

the transmitter 1302 comprises a determination unit 1303 and a transmission unit 1304, wherein, the determination unit 1303 is configured to determine according to the first message whether the first OpenFlow switch is under the management of the OpenFlow controller;

the transmission unit 1304 is configured to send a first response message to the first OpenFlow switch when the determination unit 1303 determines that the first OpenFlow switch is under the management of the OpenFlow controller, wherein the first response message corresponds to the first message;

the receiver 1301 is further configured to receive a second message sent from the first OpenFlow switch, wherein the second message comprises type information of a first connection and parameters related to the first OpenFlow switch among parameters of the first connection, and the first connection is a connection to be established between the first OpenFlow switch and the OpenFlow controller.

Optionally, the determination unit 1303 specifically comprises a detection subunit and a first determination subunit, wherein, the detection subunit is configured to detect whether an ID of the first OpenFlow switch is comprised in a database, wherein the first message comprises the ID of the first OpenFlow switch, and the database comprises IDs of OpenFlow switches managed by the OpenFlow controller;

the first determination subunit is configured to determine that the first OpenFlow switch is under the management of the OpenFlow controller when the detection subunit detects that the ID of the first OpenFlow switch is comprised in the database.

Optionally, the determination unit 1303 specifically comprises a judgment subunit and a second determination subunit, wherein, the judgment subunit is configured to judge whether an OpenFlow controller corresponding to the ID of the first OpenFlow controller is the first OpenFlow controller, wherein the first message comprises the ID of the first OpenFlow switch;

the second determination subunit is configured to determine that the first OpenFlow switch is under the management of the OpenFlow controller when the judgment subunit determines that the OpenFlow controller corresponding to the ID of the first OpenFlow controller is the first OpenFlow controller.

Optionally, the receiver comprises a first receiving subunit; wherein the first receiving subunit is configured to receive the first message forwarded by a second OpenFlow switch through a controller channel, the first message transmitted from the first OpenFlow switch in a manner of broadcast.

Optionally, the receiver comprises a second receiving subunit; wherein the second receiving subunit is configured to receive the first message forwarded by a second OpenFlow switch through a controller channel, the first message transmitted from the first OpenFlow switch in a manner of multicast, wherein the OpenFlow controller is a member of a multicast group corresponding to the multicast.

Optionally, the OpenFlow controller further comprises an execution unit, which is configured to execute actions of establishing the first connection, the actions including initiating an establishment request for the first connection to the first OpenFlow switch according to the type information of the first connection, and the parameters related to the first OpenFlow switch among the parameters of the first connection.

The OpenFlow controller provided in this embodiment can be realized through the method provided in embodiment 3. In a specific implementation, embodiment 3 can be referenced.

Embodiment 14

Figure 14:
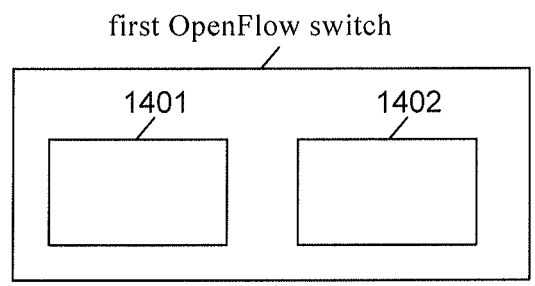
FIG. 14 is a schematic structure diagram of another first OpenFlow switch provided in an embodiment of the present invention.

Another first OpenFlow switch is provided in an embodiment of the present invention, capable of automatically acquiring parameters of a connection to be established. Referring to FIG. 14, FIG. 14 is a schematic structure diagram of a first OpenFlow switch provided in an embodiment of the present invention. The first OpenFlow switch comprises:

a transmitter 1401 and a receiver 1402; wherein, the transmitter 1401 is configured to transmit a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message corresponds to the first message;

the receiver 1402 is configured to receive the first response message.

The transmitter 1401 is further configured to transmit a second message to the OpenFlow controller, wherein the second message comprises type information of a first connection and parameters related to the first OpenFlow switch among parameters of the first connection, and the first connection is a connection to be established between the first OpenFlow switch and the OpenFlow controller.

Optionally, the transmitter 1401 specifically comprises a first transmission subunit, wherein the first transmission subunit is configured to transmit the first message in a manner of broadcast, so that a second OpenFlow switch forwards the first message to the first OpenFlow controller through a controller channel after receiving the first message.

Optionally, the transmitter 1401 specifically comprises a second transmission subunit for transmitting the first message in a manner of multicast, so that a second OpenFlow switch forwards the first message to the first OpenFlow controller through a controller channel after receiving the first message, wherein the OpenFlow controller is a member of a multicast group corresponding to the multicast.

Optionally, the first OpenFlow switch further comprises an execution unit, which is configured to execute actions of establishing the first connection, the actions including responding to an establishment request of the first connection initiated by the OpenFlow controller according to the type information of the first connection, and the parameters related to the first OpenFlow switch among the parameters of the first connection.

The first OpenFlow switch provided in this embodiment can be realized through the method provided in embodiment 4. In a specific implementation, embodiment 4 can be referenced.

Embodiment 15

Figure 15:
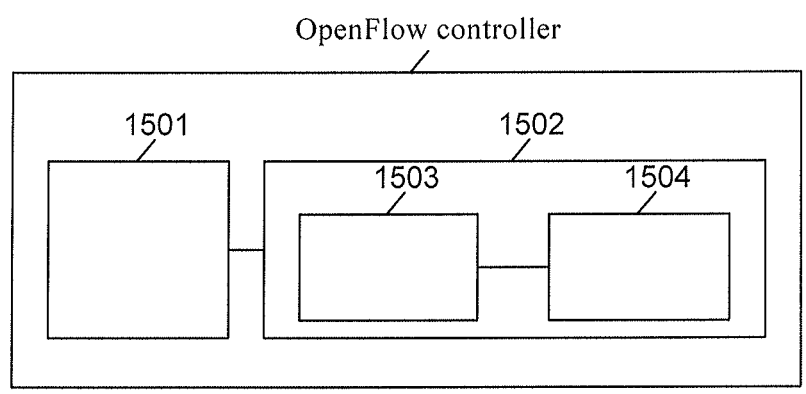
FIG. 15 is a schematic structure diagram of another OpenFlow controller provided in an embodiment of the present invention.

Another OpenFlow controller is provided in an embodiment of the present invention, capable of automatically acquiring parameters of a connection to be established. Referring to FIG. 15, FIG. 15 is a schematic structure diagram of an OpenFlow controller provided in an embodiment of the present invention. The OpenFlow controller comprises:

a receiver 1501 and a transmitter 1502, wherein, the receiver 1501 is configured to receive a first message sent from a first OpenFlow switch;

the transmitter 1502 comprises a determination unit 1503 and a transmission unit 1504, wherein, the determination unit 1503 is configured to determine according to the first message whether the first OpenFlow switch is under the management of the OpenFlow controller;

the transmission unit 1504 is configured to send a first response message to the first OpenFlow switch when the determination unit 1503 determines that the first OpenFlow switch is under the management of the OpenFlow controller, wherein the first response message corresponds to the first message;

the transmitter 1502 is further configured to transmit a second message to the first OpenFlow switch, wherein the second message comprises type information of a first connection and parameters related to the OpenFlow controller among parameters of the first connection, and the first connection is a connection to be established between the first OpenFlow switch and the OpenFlow controller.

Optionally, the determination unit 1503 specifically comprises a detection subunit and a first determination subunit, wherein, the detection subunit is configured to detect whether an ID of the first OpenFlow switch is comprised in a database, wherein the first message comprises the ID of the first OpenFlow switch, and the database comprises IDs of OpenFlow switches managed by the OpenFlow controller; and the first determination subunit is configured to determine that the first OpenFlow switch is under the management of the OpenFlow controller when the detection subunit detects that the ID of the first OpenFlow switch is comprised in the database.

Optionally, the determination unit 1503 specifically comprises a judgment subunit and a second determination subunit, wherein, the judgment subunit is configured to judge whether an OpenFlow controller corresponding to the ID of the first OpenFlow controller is the first OpenFlow controller, wherein the first message comprises the ID of the first OpenFlow controller; and the second determination subunit is configured to determine that the first OpenFlow switch is under the management of the OpenFlow controller when the judgment subunit determines that then OpenFlow controller corresponding to the ID of the first OpenFlow controller is the first OpenFlow controller.

Optionally, the receiver 1501 comprises a first receiving subunit; wherein the first receiving subunit is configured to receive the first message forwarded by a second OpenFlow switch through a controller channel, the first message transmitted from the first OpenFlow switch in a manner of broadcast.

Optionally, the receiver 1501 comprises a second receiving subunit; wherein the second receiving subunit is configured to receive the first message forwarded by a second OpenFlow switch through a controller channel, the first message transmitted from the first OpenFlow switch in a manner of multicast, wherein the OpenFlow controller is a member of a multicast group corresponding to the multicast.

Optionally, the OpenFlow controller further comprises an execution unit, which is configured to execute actions of establishing the first connection, the actions including responding to an establishment request for the first connection initiated by the first OpenFlow switch according to the type information of the first connection, and the parameters related to the OpenFlow controller among the parameters of the first connection.

The OpenFlow controller provided in this embodiment can be realized through the method provided in embodiment 5. In a specific implementation, embodiment 5 can be referenced.

Embodiment 16

Figure 16:
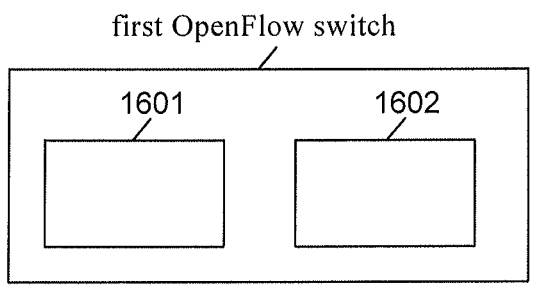
FIG. 16 is a schematic structure diagram of another first OpenFlow switch provided in an embodiment of the present invention.

Another first OpenFlow switch is provided in an embodiment of the present invention, capable of automatically acquiring parameters of a connection to be established. Referring to FIG. 16, FIG. 16 is a schematic structure diagram of a first OpenFlow switch provided in an embodiment of the present invention. The first OpenFlow switch comprises:

a transmitter 1601 and a receiver 1602; wherein, the transmitter 1601 is configured to transmit a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message corresponds to the first message;

the receiver 1602 is configured to receive the first response message;

the receiver 1602 is further configured to receive a second message sent from the OpenFlow controller, wherein the second message comprises type information of a first connection and parameters related to the OpenFlow controller among parameters of the first connection, and the first connection is a connection to be established between the first OpenFlow switch and the OpenFlow controller.

Optionally, the transmitter 1601 specifically comprises a first transmission subunit, wherein the first transmission subunit is configured to transmit the first message in a manner of broadcast, so that a second OpenFlow switch forwards the first message to the first OpenFlow controller through a controller channel after receiving the first message.

Optionally, the transmitter 1601 specifically comprises a second transmission subunit for transmitting the first message in a manner of multicast, so that a second OpenFlow switch forwards the first message to the first OpenFlow controller through a controller channel after receiving the first message, wherein the OpenFlow controller is a member of a multicast group corresponding to the multicast.

Optionally, the first OpenFlow switch further comprises an execution unit, which is configured to execute actions of establishing the first connection, the actions including initiating an establishment request for the first connection to the OpenFlow controller according to the type information of the first connection, and the parameters related to the OpenFlow controller among the parameters of the first connection.

The first OpenFlow switch provided in this embodiment can be realized through the method provided in embodiment 6. In a specific implementation, embodiment 6 can be referenced.

Embodiment 17

Figure 17:
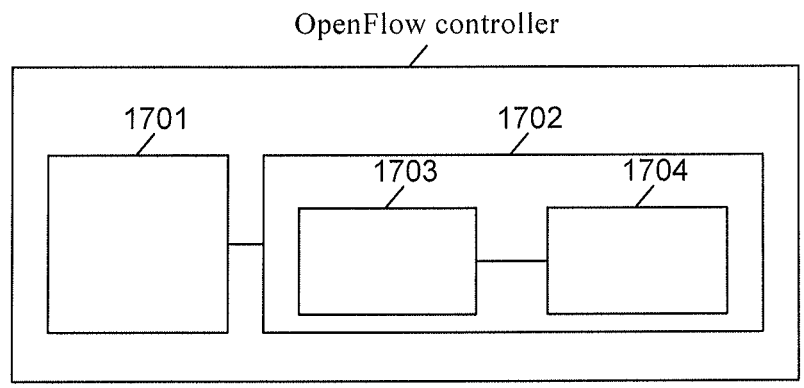
FIG. 17 is a schematic structure diagram of another OpenFlow controller provided in an embodiment of the present invention.

Another OpenFlow controller is provided in an embodiment of the present invention, capable of automatically acquiring parameters of a connection to be established. Referring to FIG. 17, FIG. 17 is a schematic structure diagram of an OpenFlow controller provided in an embodiment of the present invention. The OpenFlow controller comprises:

a receiver 1701 and a transmitter 1702, wherein, the receiver 1701 is configured to receive a first message sent from a first OpenFlow switch;

the transmitter 1702 comprises a determination unit 1703 and a transmission unit 1704, wherein, the determination unit 1703 is configured to determine according to the first message whether the first OpenFlow switch is under the management of the OpenFlow controller;

the transmission unit 1704 is configured to send a first response message to the first OpenFlow switch when the determination unit 1703 determines that the first OpenFlow switch is under the management of the OpenFlow controller, wherein the first response message corresponds to the first message;

the transmitter 1702 is further configured to transmit a second message to the first OpenFlow switch, wherein the second message comprises type information of a first connection and parameters related to the OpenFlow controller among parameters of the first connection, and the first connection is a connection to be established between the first OpenFlow switch and the OpenFlow controller; and the receiver 1701 is further configured to receive a second response message sent from the first OpenFlow switch, wherein the second response message comprises parameters related to the first OpenFlow switch among the parameters of the first connection, and the second response message corresponds to the second message.

Optionally, the determination unit 1703 specifically comprises a detection subunit and a first determination subunit, wherein, the detection subunit is configured to detect whether an ID of the first OpenFlow switch is comprised in a database, wherein the first message comprises the ID of the first OpenFlow switch, and the database comprises IDs of OpenFlow switches managed by the OpenFlow controller; and the first determination subunit is configured to determine that the first OpenFlow switch is under the management of the OpenFlow controller when the detection subunit detects that the ID of the first OpenFlow switch is comprised in the database.

Optionally, the determination unit 1703 specifically comprises a judgment subunit and a second determination subunit, wherein, the judgment subunit is configured to judge whether an OpenFlow controller corresponding to the ID of a first OpenFlow controller is the first OpenFlow controller, wherein the first message comprises the ID of the first OpenFlow controller;

the second determination subunit is configured to determine that the first OpenFlow switch is under the management of the OpenFlow controller when the judgment subunit determines that the OpenFlow controller corresponding to the ID of the first OpenFlow controller is the first OpenFlow controller.

Optionally, the receiver 1701 comprises a first receiving subunit; wherein the first receiving subunit is configured to receive the first message forwarded by a second OpenFlow switch through a controller channel, the first message transmitted from the first OpenFlow switch in a manner of broadcast.

Optionally, the receiver 1701 comprises a second receiving subunit; wherein the second receiving subunit is configured to receive the first message forwarded by a second OpenFlow switch through a controller channel, the first message transmitted from the first OpenFlow switch in a manner of multicast, wherein the OpenFlow controller is a member of a multicast group corresponding to the multicast.

Optionally, the OpenFlow controller further comprises an execution unit, which is configured to execute actions of establishing the first connection, the actions including responding to an establishment request for the first connection initiated by the first OpenFlow switch according to the type information of the first connection, the parameters related to the first OpenFlow switch among the parameters of the first connection, and the parameters related to the OpenFlow controller among the parameters of the first connection.

Optionally, the OpenFlow controller further comprises an execution unit, which is configured to execute actions of establishing the first connection, the actions including initiating an establishment request for the first connection to the first OpenFlow switch according to the type information of the first connection, the parameters related to the first OpenFlow switch among the parameters of the first connection, and the parameters related to the OpenFlow controller among the parameters of the first connection.

The OpenFlow controller provided in this embodiment can be realized through the method provided in embodiment 7. In a specific implementation, embodiment 7 can be referenced.

Embodiment 18

Figure 18:
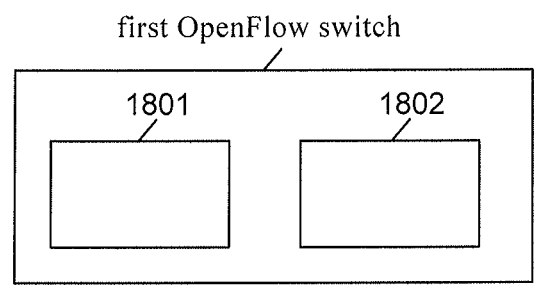
FIG. 18 is a schematic structure diagram of another first OpenFlow switch provided in an embodiment of the present invention.

Another first OpenFlow switch is provided in an embodiment of the present invention, capable of automatically acquiring parameters of a connection to be established. Referring to FIG. 18, FIG. 18 is a schematic structure diagram of a first OpenFlow switch provided in an embodiment of the present invention. The first OpenFlow switch comprises:

a transmitter 1801 and a receiver 1802; wherein, the transmitter 1801 is configured to transmit a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message corresponds to the first message;

the receiver 1802 is configured to receive the first response message.

The receiver 1802 is further configured to receive a second message sent from the OpenFlow controller, wherein the second message comprises type information of a first connection and parameters related to the OpenFlow controller among parameters of the first connection, and the first connection is a connection to be established between the first OpenFlow switch and the OpenFlow controller;

the transmitter 1801 is further configured to transmit a second response message to the OpenFlow controller, wherein the second response message comprises parameters related to the first OpenFlow switch among the parameters of the first connection, and the second response message corresponds to the second message.

Optionally, the transmitter 1801 specifically comprises a first transmission subunit, wherein the first transmission subunit is configured to transmit the first message in a manner of broadcast, so that a second OpenFlow switch forwards the first message to the first OpenFlow controller through a controller channel after receiving the first message.

Optionally, the transmitter 1801 specifically comprises a second transmission subunit for transmitting the first message in a manner of multicast, so that a second OpenFlow switch forwards the first message to the first OpenFlow controller through a controller channel after receiving the first message, wherein the OpenFlow controller is a member of a multicast group corresponding to the multicast.

Optionally, the first OpenFlow switch further comprises an execution unit, which is configured to execute actions of establishing the first connection, the actions including initiating an establishment request for the first connection to the OpenFlow controller according to the type information of the first connection, the parameters related to the first OpenFlow switch among the parameters of the first connection, and the parameters related to the OpenFlow controller among the parameters of the first connection.

Optionally, the first OpenFlow switch further comprises an execution unit, which is configured to execute actions of establishing the first connection, the actions including responding to an establishment request for the first connection initiated by the OpenFlow controller according to the type information of the first connection, the parameters related to the first OpenFlow switch among the parameters of the first connection, and the parameters related to the OpenFlow controller among the parameters of the first connection.

The first OpenFlow switch provided in this embodiment can be realized through the method provided in embodiment 8. In a specific implementation, embodiment 8 can be referenced.

Embodiment 19

Figure 19:
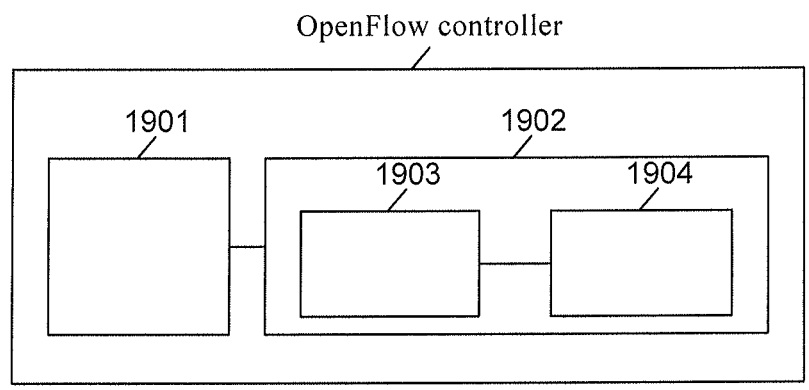
FIG. 19 is a schematic structure diagram of another OpenFlow controller provided in an embodiment of the present invention.

Another OpenFlow controller is provided in an embodiment of the present invention, capable of automatically acquiring parameters of a connection to be established. Referring to FIG. 19, FIG. 19 is a schematic structure diagram of an OpenFlow controller provided in an embodiment of the present invention. The OpenFlow controller comprises:

a receiver 1901 and a transmitter 1902, wherein, the receiver 1901 is configured to receive a first message sent from a first OpenFlow switch;

the transmitter 1902 comprises a determination unit 1903 and a transmission unit 1904, wherein, the determination unit 1903 is configured to determine according to the first message whether the first OpenFlow switch is under the management of the OpenFlow controller;

the transmission unit 1904 is configured to send a first response message to the first OpenFlow switch when the determination unit 1903 determines that the first OpenFlow switch is under the management of the OpenFlow controller, wherein the first response message corresponds to the first message;

the receiver 1901 is further configured to receive a second message sent from the first OpenFlow switch, wherein the second message comprises type information of a first connection and parameters related to the first OpenFlow switch among parameters of the first connection, and the first connection is a connection to be established between the first OpenFlow switch and the OpenFlow controller; and the transmitter 1902 is further configured to transmit a second response message to the first OpenFlow switch, wherein the second response message comprises parameters related to the OpenFlow controller among the parameters of the first connection.

Optionally, the determination unit 1903 specifically comprises a detection subunit and a first determination subunit, wherein, the detection subunit is configured to detect whether an ID of the first OpenFlow switch is comprised in a database, wherein the first message comprises the ID of the first OpenFlow switch, and the database comprises IDs of OpenFlow switches managed by the OpenFlow controller;

the first determination subunit is configured to determine that the first OpenFlow switch is under the management of the OpenFlow controller when the detection subunit detects that the ID of the first OpenFlow switch is comprised in the database.

Optionally, the determination unit 1903 specifically comprises a judgment subunit and a second determination subunit, wherein, the judgment subunit is configured to judge whether an OpenFlow controller corresponding to the ID of the first OpenFlow controller is the first OpenFlow controller, wherein the first message comprises the ID of the first OpenFlow controller; and the second determination subunit is configured to determine that the first OpenFlow switch is under the management of the OpenFlow controller when the judgment subunit determines that the OpenFlow controller corresponding to the ID of the first OpenFlow controller is the first OpenFlow controller.

Optionally, the receiver 1901 comprises a first receiving subunit, wherein the first receiving subunit is configured to receive the first message forwarded by a second OpenFlow switch through a controller channel, the first message transmitted from the first OpenFlow switch in a manner of broadcast.

Optionally, the receiver 1901 comprises a second receiving subunit, wherein the second receiving subunit is configured to receive the first message forwarded by a second OpenFlow switch through a controller channel, the first message transmitted from the first OpenFlow switch in a manner of multicast, wherein the OpenFlow controller is a member of a multicast group corresponding to the multicast.

Optionally, the OpenFlow controllers further comprises an execution unit, which is configured to execute actions of establishing the first connection, the actions including initiating an establishment request for the first connection to the first OpenFlow switch according to the type information of the first connection, the parameters related to the first OpenFlow switch among the parameters of the first connection, and the parameters related to the OpenFlow controller among the parameters of the first connection.

Optionally, the OpenFlow controller further comprises an execution unit, which is configured to execute actions of establishing the first connection, the actions including responding to an establishment request for the first connection initiated by the first OpenFlow switch according to the type information of the first connection, the parameters related to the first OpenFlow switch among the parameters of the first connection, and the parameters related to the OpenFlow controller among the parameters of the first connection.

The OpenFlow controller provided in this embodiment can be realized through the method provided in embodiment 9. In a specific implementation, embodiment 9 can be referenced.

Embodiment 20

Figure 20:
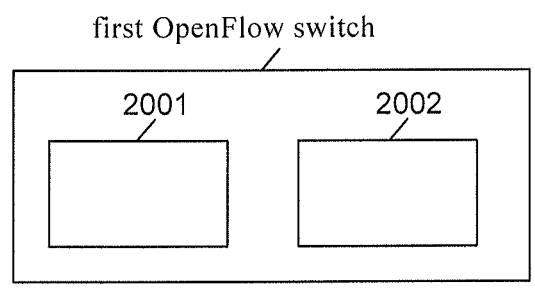
FIG. 20 is a schematic structure diagram of another first OpenFlow switch provided in an embodiment of the present invention.

Another first OpenFlow switch is provided in an embodiment of the present invention, capable of automatically acquiring parameters of a connection to be established. Referring to FIG. 20, FIG. 20 is a schematic structure diagram of a first OpenFlow switch provided in an embodiment of the present invention. The first OpenFlow switch comprises:

a transmitter 2001 and a receiver 2002; wherein, the transmitter 2001 is configured to transmit a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message corresponds to the first message;

the receiver 2002 is configured to receive the first response message;

the transmitter 2011 is further configured to transmit a second message to the OpenFlow controller, wherein the second message comprises type information of a first connection and parameters related to the first OpenFlow switch among parameters of the first connection, and the first connection is a connection to be established between the first OpenFlow switch and the OpenFlow controller;

the receiver 2002 is further configured to receive a second response message sent from the OpenFlow controller, wherein the second response message comprises parameters related to the OpenFlow controller among the parameters of the first connection.

Optionally, the transmitter 2001 specifically comprises a first transmission subunit, wherein the first transmission subunit is configured to transmit the first message in a manner of broadcast, so that a second OpenFlow switch forwards the first message to the first OpenFlow controller through a controller channel after receiving the first message.

Optionally, the transmitter 2001 specifically comprises a second transmission subunit for transmitting the first message in a manner of multicast, so that a second OpenFlow switch forwards the first message to the first OpenFlow controller through a controller channel after receiving the first message, wherein the OpenFlow controller is a member of a multicast group corresponding to the multicast.

Optionally, the first OpenFlow switch further comprises an execution unit, which is configured to execute actions of establishing the first connection, the actions including responding to an establishment request for the first connection initiated by the OpenFlow controller according to the type information of the first connection, the parameters related to the first OpenFlow switch among the parameters of the first connection, and the parameters related to the OpenFlow controller among the parameters of the first connection.

Optionally, the first OpenFlow switch further comprises an execution unit, which is configured to execute actions of establishing the first connection, the actions including initiating an establishment request for the first connection to the OpenFlow controller according to the type information of the first connection, the parameters related to the first OpenFlow switch among the parameters of the first connection, and the parameters related to the OpenFlow controller among the parameters of the first connection.

The first OpenFlow switch provided in this embodiment can be realized through the method provided in embodiment 10. In a specific implementation, embodiment 10 can be referenced.

It should be noted that embodiments 1 to 20 refer to first OpenFlow switch and second OpenFlow switch, wherein the word "first" of the "first OpenFlow switch" is merely to stress that the "first OpenFlow switch" is a device different from the "second OpenFlow switch". Similarly, the word "second" of the "second OpenFlow switch" is merely to stress that the "second OpenFlow switch" is a device different from the "first OpenFlow switch".

Those skilled in the art may understand: some or all steps of the method of the above described embodiment can be realized with programs and instruction related hardware, the programs can be stored in a computer readable storage medium, such as ROM, RAM, a magnetic disk, an optical disc, or various mediums capable of storing program codes, and when the program is executed, steps of the method of the embodiment are executed.

It should be noted that the above embodiments are for the purpose of describing the technical solution of the present invention, rather limiting thereof. Although the detailed descriptions have been presented by referencing to the above embodiments, those skilled in the art should understand the technical solutions of the above embodiments can be modified, or a portion of technical features thereof can be replaced, which will not depart from the spirit or scope of the various embodiments of the present invention.

What is claimed is:

1. A message transmitting method, comprising:
   receiving a first message sent from a first OpenFlow switch by an OpenFlow controller; and
   transmitting a first response message to the first OpenFlow switch by the OpenFlow controller when the OpenFlow controller determines according to the first message that the first OpenFlow switch is under the management of the OpenFlow controller, wherein the first response message comprises type information of a first connection and parameters related to the OpenFlow controller among parameters of the first connection, the first connection is a connection to be established between the first OpenFlow switch and the OpenFlow controller, the first response message corresponds to the first message, that the first OpenFlow switch is under the management of the OpenFlow controller is determined by the OpenFlow controller when an ID of the first OpenFlow switch in a database is detected by the OpenFlow controller, the database comprises IDs of OpenFlow switches managed by the OpenFlow controller, and the first message comprises the ID of the first OpenFlow switch.

2. The method according to claim 1, wherein,
   receiving the first message sent from the first OpenFlow switch by the OpenFlow controller specifically comprises:
   receiving, by the OpenFlow controller, the first message forwarded by a second OpenFlow switch through a controller channel, the first message is transmitted from the first OpenFlow switch in a manner of broadcast.

3. The method according to claim 1, wherein,
   receiving the first message sent from the first OpenFlow switch by the OpenFlow controller specifically comprises:
   receiving, by the OpenFlow controller, the first message forwarded by a second OpenFlow switch through a controller channel, the first message is transmitted from the first OpenFlow switch in a manner of multicast, wherein the OpenFlow controller is a member of a multicast group corresponding to the multicast.

4. The method according to claim 1, wherein, after transmitting the first response message to the first OpenFlow switch by the OpenFlow controller, the method further comprises:
   executing actions of establishing the first connection by the OpenFlow controller, the actions including responding to an establishment request for the first connection initiated by the first OpenFlow switch according to the type information of the first connection, and the parameters related to the OpenFlow controller among the parameters of the first connection.

5. A message receiving method, comprising:
   transmitting a first message to an OpenFlow controller by a first OpenFlow switch, so that the OpenFlow controller sends a first response message to the first OpenFlow switch when the OpenFlow controller determines according to the first message that the first OpenFlow switch is under the management of the OpenFlow controller, wherein the first response message comprises type information of a first connection and parameters related to the OpenFlow controller among parameters of the first connection, the first connection is a connection to be established between the first OpenFlow switch and the OpenFlow controller, the first response message corresponds to the first message, that the first OpenFlow switch is under the management of the OpenFlow controller is determined by the OpenFlow controller when an ID of the first OpenFlow switch in a database is detected by the OpenFlow controller, the database comprises IDs of OpenFlow switches managed by the OpenFlow controller, and the first message comprises the ID of the first OpenFlow switch; and receiving the first response message by the first OpenFlow switch.

6. The method according to claim 5, wherein, transmitting the first message to the OpenFlow controller by the first OpenFlow switch specifically comprises: transmitting the first message in a manner of broadcast by the first OpenFlow switch, so that a second OpenFlow switch forwards the first message to the OpenFlow controller through a controller channel after receiving the first message.

7. The method according to claim 5, wherein, transmitting the first message to the OpenFlow controller by the first OpenFlow switch specifically comprises: transmitting the first message in a manner of multicast by the first OpenFlow switch, so that a second OpenFlow switch forwards the first message to the OpenFlow controller through a controller channel after receiving the first message, wherein the OpenFlow controller is a member of a multicast group corresponding to the multicast.

8. The method according to claim 5, wherein, after receiving the first response message by the first OpenFlow switch, the method further comprises:
executing actions of establishing the first connection by the first OpenFlow switch, the actions including initiating an establishment request for the first connection to the OpenFlow controller according to the type information of the first connection, and the parameters related to the OpenFlow controller among the parameters of the first connection.

9. A message transmitting method, comprising:
receiving a first message sent from a first OpenFlow switch by an OpenFlow controller;
transmitting a first response message to the first OpenFlow switch by the OpenFlow controller when the OpenFlow controller determines according to the first message that the first OpenFlow switch is under the management of the OpenFlow controller, wherein the first response message corresponds to the first message, that the first OpenFlow switch is under the management of the OpenFlow controller is determined by the OpenFlow controller when an ID of the first OpenFlow switch in a database is detected by the OpenFlow controller, the database comprises IDs of OpenFlow switches managed by the OpenFlow controller, and the first message comprises the ID of the first OpenFlow switch;
receiving a second message sent from the first OpenFlow switch by the OpenFlow controller, wherein the second message comprises type information of a first connection and parameters related to the first OpenFlow switch among parameters of the first connection, and the first connection is a connection to be established between the first OpenFlow switch and the OpenFlow controller; and
transmitting a second response message to the first OpenFlow switch by the OpenFlow controller, wherein the second response message comprises parameters related to the OpenFlow controller among the parameters of the first connection.

10. The method according to claim 9, wherein, receiving the first message sent from the first OpenFlow switch by the OpenFlow controller comprises:
receiving, by the OpenFlow controller, the first message forwarded by a second OpenFlow switch through a controller channel, the first message transmitted from the first OpenFlow switch in a manner of broadcast.

11. The method according to claim 9, wherein, receiving the first message sent from the first OpenFlow switch by the OpenFlow controller specifically comprises:
receiving, by the OpenFlow controller, the first message forwarded by a second OpenFlow switch through a controller channel, the first message transmitted from the first OpenFlow switch in a manner of multicast, wherein the OpenFlow controller is a member of a multicast group corresponding to the multicast.

12. The method according to claim 9, wherein, after transmitting the second response message from the OpenFlow controller to the first OpenFlow switch, the method further comprises:
executing actions of establishing the first connection by the OpenFlow controller, the actions including initiating an establishment request for the first connection to the first OpenFlow switch according to the type information of the first connection, the parameters related to the first OpenFlow switch among the parameters of the first connection, and the parameters related to the OpenFlow controller among the parameters of the first connection.

13. The method according to claim 9, wherein, after transmitting the second response message from the OpenFlow controller to the first OpenFlow switch, the method further comprises:
executing actions of establishing the first connection by the OpenFlow controller, the actions including responding to an establishment request for the first connection initiated by the first OpenFlow switch according to the type information of the first connection, the parameters related to the first OpenFlow switch among the parameters of the first connection, and the parameters related to the OpenFlow controller among the parameters of the first connection.

14. A message receiving method, comprising:
transmitting a first message to an OpenFlow controller by a first OpenFlow switch, so that the OpenFlow controller sends a first response message to the first OpenFlow switch when the OpenFlow controller determines according to the first message that the first OpenFlow switch is under the management of the OpenFlow controller, wherein the first response message corresponds to the first message, that the first OpenFlow switch is under the management of the OpenFlow controller is determined by the OpenFlow controller when an ID of the first OpenFlow switch in a database is detected by the OpenFlow controller, the database comprises IDs of OpenFlow switches managed by the OpenFlow controller, and the first message comprises the ID of the first OpenFlow switch;
receiving the first response message by the first OpenFlow switch;
transmitting a second message from the first OpenFlow switch to the OpenFlow controller, wherein the second message comprises type information of a first connection and parameters related to the first OpenFlow switch among parameters of the first connection, and the first connection is a connection to be established between the first OpenFlow switch and the OpenFlow controller; and receiving a second response message sent from the OpenFlow controller by the first OpenFlow switch, wherein the second response message comprises parameters related to the OpenFlow controller among the parameters of the first connection.

15. The method according to claim 14, wherein, transmitting the first message to the OpenFlow controller by the first OpenFlow switch specifically comprises:
transmitting the first message in a manner of broadcast by the first OpenFlow switch, so that a second OpenFlow switch forwards the first message to the OpenFlow controller through a controller channel after receiving the first message.

16. The method according to claim 14, wherein, transmitting the first message to the OpenFlow controller by the first OpenFlow switch specifically comprises:
transmitting the first message in a manner of multicast by the first OpenFlow switch, so that a second OpenFlow switch forwards the first message to the OpenFlow controller through a controller channel after receiving the first message, wherein the OpenFlow controller is a member of a multicast group corresponding to the multicast.

17. The method according to claim 14, wherein, after receiving the second response message sent from the OpenFlow controller by the first OpenFlow switch, the method further comprises:
executing actions of establishing the first connection by the first OpenFlow switch, the actions including responding to an establishment request for the first connection initiated by the OpenFlow controller according to the type information of the first connection, the parameters related to the first OpenFlow switch among the parameters of the first connection, and the parameters related to the OpenFlow controller among the parameters of the first connection.

18. The method according to claim 14, wherein, after receiving the second response message sent from the OpenFlow controller by the first OpenFlow switch, the method further comprises:
executing actions of establishing the first connection by the first OpenFlow switch, the actions including initiating an establishment request for the first connection to the OpenFlow controller according to the type information of the first connection, the parameters related to the first OpenFlow switch among the parameters of the first connection, and the parameters related to the OpenFlow controller among the parameters of the first connection.

19. An OpenFlow controller, comprising:
a receiver and a transmitter, wherein,
the receiver is configured to receive a first message sent from a first OpenFlow switch;
the transmitter comprises a determination unit and a transmission unit
configured to determine according to the first message whether the first OpenFlow switch is under the management of the OpenFlow controller, that the first OpenFlow switch is under the management of the OpenFlow controller is determined when an ID of the first OpenFlow switch in a database is detected by the OpenFlow controller, the database comprises IDs of OpenFlow switches managed by the OpenFlow controller, and the first message comprises the ID of the first OpenFlow switch; and
the transmission unit configured to send a first response message to the first OpenFlow switch when the determination unit determines that the first OpenFlow switch is under the management of the OpenFlow controller, wherein the first response message comprises type information of a first connection and parameters related to the OpenFlow controller among parameters of the first connection, the first connection is a connection to be established between the first OpenFlow switch and the OpenFlow controller, and the first response message corresponds to the first message.

20. The OpenFlow controller according to claim 19, wherein,
the receiver comprises a first receiving subunit; wherein,
the first receiving subunit is configured to receive the first message forwarded by a second OpenFlow switch through a controller channel, the first message transmitted from the first OpenFlow switch in a manner of broadcast.

21. The OpenFlow controller according to claim 19, wherein,
the receiver comprises a second receiving subunit; wherein,
the second receiving subunit is configured to receive the first message forwarded by a second OpenFlow switch through a controller channel, the first message transmitted from the first OpenFlow switch in a manner of multicast, wherein the OpenFlow controller is a member of a multicast group corresponding to the multicast.

22. The OpenFlow controller according to claim 19, wherein,
the OpenFlow controller further comprises an execution unit, which is configured to execute actions of establishing the first connection, the actions including responding to an establishment request for the first connection initiated by the first OpenFlow switch according to the type information of the first connection, and the parameters related to the OpenFlow controller among the parameters of the first connection.

23. A first OpenFlow switch, comprising:
a transmitter configured to send a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message comprises type information of a first connection and parameters related to the OpenFlow controller among parameters of the first connection, the first connection is a connection to be established between the first OpenFlow switch and the OpenFlow controller, the first response message corresponds to the first message, that the first OpenFlow switch is under the management of the OpenFlow controller is determined by the OpenFlow controller when an ID of the first OpenFlow switch in a database is detected by the OpenFlow controller, the database comprises IDs of OpenFlow switches managed by the OpenFlow controller, and the first message comprises the ID of the first OpenFlow switch; and
a receiver configured to receive the first response message.

24. The first OpenFlow switch according to claim 23, wherein, the transmitter specifically comprises a first transmission subunit for transmitting the first message in a manner of broadcast, so that a second OpenFlow switch forwards the first message to the OpenFlow controller through a controller channel after receiving the first message.

25. The first OpenFlow switch according to claim 23, wherein,
the transmitter specifically comprises a second transmission subunit for transmitting the first message in a manner of multicast, so that a second OpenFlow switch forwards the first message to the OpenFlow controller through a controller channel after receiving the first message, wherein the OpenFlow controller is a member of a multicast group corresponding to the multicast.

26. The first OpenFlow switch according to claim 23, wherein,
the first OpenFlow switch further comprises an execution unit, which is configured to execute actions of establishing the first connection, the actions including initiating an establishment request for the first connection to the OpenFlow controller according to the type information of the first connection, and the parameters related to the OpenFlow controller among the parameters of the first connection.

27. An OpenFlow controller, comprising:
a receiver and a transmitter, wherein,
the receiver is configured to receive a first message sent from a first OpenFlow switch;
the transmitter comprises a determination unit and a transmission unit
configured to determine according to the first message whether the first OpenFlow switch is under the management of the OpenFlow controller and;
the transmission unit configured to send a first response message to the first OpenFlow switch when the determination unit determines that the first OpenFlow switch is under the management of the OpenFlow controller, wherein the first response message corresponds to the first message, that the first OpenFlow switch is under the management of the OpenFlow controller is determined when an ID of the first OpenFlow switch in a database is detected by the OpenFlow controller, the database comprises IDs of OpenFlow switches managed by the OpenFlow controller, and the first message comprises the ID of the first OpenFlow switch;
the receiver is further configured to receive a second message sent from the first OpenFlow switch, wherein the second message comprises type information of a first connection and parameters related to the first OpenFlow switch among parameters of the first connection, and the first connection is a connection to be established between the first OpenFlow switch and the OpenFlow controller; and
the transmitter is further configured to transmit a second response message to the first OpenFlow switch, wherein the second response message comprises parameters related to the OpenFlow controller among the parameters of the first connection.

28. The OpenFlow controller according to claim 27, wherein,
the receiver comprises a first receiving subunit, wherein, the first receiving subunit is configured to receive the first message forwarded by a second OpenFlow switch through a controller channel, the first message transmitted from the first OpenFlow switch in a manner of broadcast.

29. The OpenFlow controller according to claim 27, wherein,
the receiver comprises a second receiving subunit, wherein,
the second receiving subunit is configured to receive the first message forwarded by a second OpenFlow switch through a controller channel, the first message transmitted from the first OpenFlow switch in a manner of multicast, wherein the OpenFlow controller is a member of a multicast group corresponding to the multicast.

30. The OpenFlow controller according to claim 27, wherein,
the OpenFlow controller further comprises an execution unit, which is configured to execute actions of establishing the first connection, the actions including initiating an establishment request for the first connection to the first OpenFlow switch according to the type information of the first connection, the parameters related to the first OpenFlow switch among the parameters of the first connection, and the parameters related to the OpenFlow controller among the parameters of the first connection.

31. The OpenFlow controller according to claim 27, wherein,
the OpenFlow controller further comprises an execution unit, which is configured to execute actions of establishing the first connection, the actions including responding to an establishment request for the first connection initiated by the first OpenFlow switch according to the type information of the first connection, the parameters related to the first OpenFlow switch among the parameters of the first connection, and the parameters related to the OpenFlow controller among the parameters of the first connection.

32. A first OpenFlow switch, comprising:
a transmitter and a receiver, wherein,
the transmitter is configured to transmit a first message to an OpenFlow controller, so that the OpenFlow controller sends a first response message to the first OpenFlow switch when the OpenFlow controller determines according to the first message that the first OpenFlow switch is under the management of the OpenFlow controller, wherein the first response message corresponds to the first message, that the first OpenFlow switch is under the management of the OpenFlow controller is determined by the OpenFlow controller when an ID of the first OpenFlow switch in a database is detected by the OpenFlow controller, the database comprises IDs of OpenFlow switches managed by the OpenFlow controller, and the first message comprises the ID of the first OpenFlow switch;
the receiver is configured to receive the first response message;
the transmitter is further configured to transmit a second message to the OpenFlow controller, wherein the second message comprises type information of a first connection and parameters related to the first OpenFlow switch among parameters of the first connection, the first connection is a connection to be established between the first OpenFlow switch and the OpenFlow controller; and
the receiver is further configured to receive a second response message sent from the OpenFlow controller, wherein the second response message comprises parameters related to the OpenFlow controller among the parameters of the first connection.

33. The first OpenFlow switch according to claim 32, wherein, the transmitter specifically comprises a first transmission subunit for transmitting the first message in a manner of broadcast, so that a second OpenFlow switch forwards the first message to the OpenFlow controller through a controller channel after receiving the first message.

34. The first OpenFlow switch according to claim 32, wherein, the transmitter specifically comprises a second transmission subunit for transmitting the first message in a manner of multicast, so that a second OpenFlow switch forwards the first message to the OpenFlow controller through a controller channel after receiving the first message, wherein the OpenFlow controller is a member of a multicast group corresponding to the multicast.

35. The first OpenFlow switch according to claim 32, wherein, the first OpenFlow switch further comprises an execution unit, which is configured to execute actions of establishing the first connection, the actions including responding to an establishment request for the first connection initiated by the OpenFlow controller according to the type information of the first connection, the parameters related to the first OpenFlow switch among the parameters of the first connection, and the parameters related to the OpenFlow controller among the parameters of the first connection.

36. The first OpenFlow switch according to claim 32, wherein, the first OpenFlow switch further comprises an execution unit, which is configured to execute actions of establishing the first connection, the actions including initiating an establishment request for the first connection to the OpenFlow controller according to the type information of the first connection, the parameters related to the first OpenFlow switch among the parameters of the first connection, and the parameters related to the OpenFlow controller among the parameters of the first connection.

* * * * *